Sept. 24, 1968 R. E. MALM 3,403,227

ADAPTIVE DIGITAL VOCODER

Filed Oct. 22, 1965 13 Sheets-Sheet 1

INVENTOR
ROBERT E. MALM

BY Hurvitz & Rose

ATTORNEYS

INVENTOR
ROBERT E. MALM
BY Hurvitz & Rose
ATTORNEYS

INVENTOR
ROBERT E. MALM

BY Hurvitz & Rose
ATTORNEYS

Sept. 24, 1968 R. E. MALM 3,403,227

ADAPTIVE DIGITAL VOCODER

Filed Oct. 22, 1965 13 Sheets-Sheet 4

INVENTOR
ROBERT E. MALM

BY Hurvitz & Rose

ATTORNEYS

INVENTOR
ROBERT E. MALM

BY Hurvitz & Rose

ATTORNEYS

INVENTOR
ROBERT E. MALM
BY Hurvitz & Rose
ATTORNEYS

ADAPTIVE DIGITAL VOCODER

INVENTOR
ROBERT E. MALM

BY Hurvitz & Rose

ATTORNEYS

INVENTOR
ROBERT E. MALM
BY Hurvitz & Rose
ATTORNEYS

Sept. 24, 1968 R. E. MALM 3,403,227
ADAPTIVE DIGITAL VOCODER
Filed Oct. 22, 1965 13 Sheets-Sheet 9

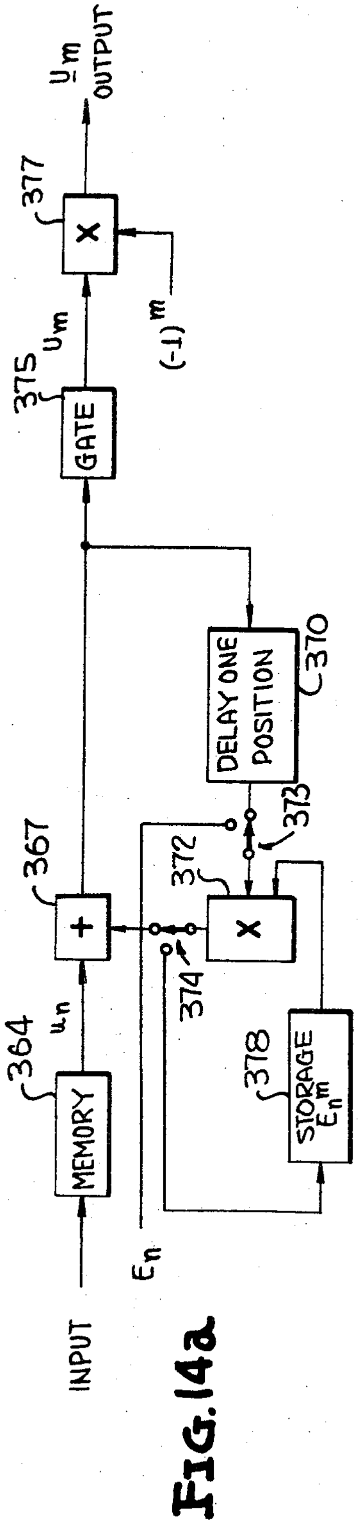

FIG. 14a

FIG. 14b

| FRAME | | | | |
|---|---|---|---|---|
| SLOT (m) | 1 | 2 | | N |
| POSITION (n) | 1 2 3 • • • N | 1 2 3 • • • N | 1 2 • • • N | 1 2 3 • • • N |
| $E^m$ | E E E • • • E | $E^2$ $E^2$ $E^2$ • • • $E^2$ | $E^3$ $E^3$ • • • $E^{N-1}$ | $E^N$ $E^N$ $E^N$ • • • $E^N$ |
| MEMORY OUTPUT | $u_1$ $u_2$ $u_3$ • • • $u_N$ | $u_1$ $u_2$ $u_3$ • • • $u_N$ | $u_1$ $u_2$ • • • $u_N$ | $u_1$ $u_2$ $u_3$ • • • $u_N$ |
| CIRCULATED ONCE | $u_1E$ $u_2E$ • • • $u_{N-1}E$ | $u_1E^2$ $u_2E^2$ • • $u_{N-1}E^2$ | $u_1E^3$ • • • $u_{N-1}E^{N-1}$ | $u_1E^N$ $u_2E^N$ • • $u_{N-1}E^N$ |
| CIRCULATED TWICE | $u_1E^2$ • • $u_{N-2}E^2$ | $u_1E^4$ • • $u_{N-2}E^4$ | • • • $u_{N-2}E^{2(N-1)}$ | $u_1E^{2N}$ • • $u_{N-2}E^{2N}$ |
| CIRCULATED (N-1) TIMES | $u_1E^{N-1}$ | $U_1E^{2(N-1)}$ | $u_1E^{(N-1)(N-1)}$ | $u_1E^{(N-1)N}$ |
| $U_m$ | $U_1$ | $U_2$ | $U_{N-1}$ | $U_N$ |
| OUTPUT $\underline{U}_m$ | $-U_1$ | $U_2$ | $-U_{N-1}$ | $U_N$ |

INVENTOR
ROBERT E. MALM

BY Hurvitz & Rose
ATTORNEYS

INVENTOR
ROBERT E. MALM

BY Hurvitz & Rose

ATTORNEYS

INVENTOR
ROBERT E. MALM

BY Hurvitz & Rose
ATTORNEYS

INVENTOR
ROBERT E. MALM

BY Hurvitz & Rose
ATTORNEYS

INVENTOR
ROBERT E. MALM

BY Hurvitz & Rose
ATTORNEYS

United States Patent Office 3,403,227
Patented Sept. 24, 1968

3,403,227
ADAPTIVE DIGITAL VOCODER
Robert E. Malm, Bethesda, Md., assignor to Page Communications Engineers, Inc., Washington, D.C., a corporation of Delaware
Filed Oct. 22, 1965, Ser. No. 501,061
34 Claims. (Cl. 179—15.55)

The present invention relates generally to speech transmission systems utilizing voice coders (vocoders), and more particularly to a highly versatile vocoder which may be employed in both high frequency and wireline applications and which may be adapted to its environment to provide high performance at all times.

As is well known, a vocoder system includes both a transmitting and a receiving station, and has as its prime function the transmission of speech signals in a coded fashion to reduce the required bandwidth of the transmission link between stations over that which would otherwise be required for a conventional uncoded speech system. The basic vocoder is of the so-called channel configuration in which a plurality of parallel signal paths are presented to an incoming speech wave, each path comprising a bandpass filter, a rectifier and a low pass filter, so designed that the narrow frequency bands processed by each channel are further compressed for transmission of the analyzed speech wave over a fraction of the original bandwidth. The signals so derived are employed to modulate a carrier and are transmitted along with voiced-unvoiced information and pitch information derived from the voiced information via a suitable transmission link, generally in a multiplexed fashion. The receiving station comprises a speech synthesizer which also includes a plurality of parallel processing channels, each including a modulator and bandpass filter arranged to reconstruct the original speech wave by operation in conjunction with an artificial pitch source and noise source controlled by voiced-unvoiced information and the transmitted pitch information. The reconstructed speech wave is applied to a suitable electroacoustic transducer, such as a loudspeaker, providing an output in the usual manner.

Another type of voice coder frequently utilized is the autocorrelation vocoder wherein the speech wave is applied to a multi-tapped delay line and to a pitch extractor, the latter including the pitch detector and voiced-unvoiced detector for production of a suitable pitch control signal from the voiced sounds. The delayed signals obtained at the several taps of the delay line are correlated with undelayed signals from the original speech wave, averaged by low pass filters and further suitably processed to provide the desired transmission of signals which are samples of the short-time autocorrelation function of the incoming speech waves, the samples being spaced at the Nyquist interval.

In a modification of the typical autocorrelation vocoder, described in U.S. Patent No. 3,109,070, granted Oct. 29, 1963, to David et al., autocorrelation control signals and appropriate weighting signals are subjected to a Fourier transformation by combination in a plurality of multipliers. The latter produce output signals which are autocorrelation amplitude spectrum samples, the samples being further processed to produce signals representative of the amplitude spectrum of the incoming speech wave. At the synthesizer the transmitted signals are subjected to an inverse Fourier transformation and other appropriate processing to reproduce the initial speech wave.

In the prior art vocoders, such as those which have been described above, design parameters are fixed or substantially fixed so that no flexibility is available to compensate for changes or variations in the characteristics of the speech wave or in the operating environment of the vocoder. In the conventional channel vocoder, for example, the design usually begins with specification of certain basic parameters, such as transmission bit rate, number of spectrum channels, number of coding levels per spectrum sample, and number of coding levels per pitch sample; after which the characteristics of the bandpass filters associated with each spectrum channel, such as center frequency, bandwidth and transfer characteristics, may be specified.

It is often desirable, however, both for purposes of research and of practical operation to provide vocoder flexibility or versatility by incorporating some freedom of variation in the parameter values of the device. Those parameters relating to digital operations, such as transmission bit rate, number of coding levels per spectrum sample and number of coding levels per pitch sample, may be varied in a relatively simple fashion. On the other hand, the characteristics of the individual filters relate to analog operations, and in such case, the desired changes are not readily effected. In the past, the variations in specific filter characteristics have been achieved through the rather obvious expedient of adapting the vocoder for replacement of filter networks by providing sets of plug-in filters for desired substitution in accordance with environmental changes. Limited flexibility may be achieved in this manner, with say 12, 16, 18 or 20 channel operations in a single vocoder arranged to accept plug-in components.

It is apparent, however, that such an approach to the problem of improving vocoder versatility is relatively complex, cumbersome and time consuming, necessitating a relatively large inventory of spare plug-in filters. In an effort to overcome the disadvantages attendant in the design and construction of new sets of filters for investigating the effect of filter characteristics on vocoder performance, Bell Laboratories personnel have simulated the operation of a vocoder of the channel type on an IBM 7090 digital computer. The process and some conclusions deriving therefrom are set forth in Golden, "Digital Computer Simulation of a Sampled-Data Voice-Excited Vocoder," Journal of the Acoustical Society of America, 35, 1358–1366 (September 1963). While some advantages, especially relating to research, are obtainable from such a technique, the procedure is obviously not economical, requiring some 172 seconds in which to analyze and synthesize one second of recorded speech. At present figures, the cost of computer time for such an operation, interpolated for equivalent vocoder operating cst, is certainly prohibitive.

In accordance with the present invention, an adaptive digital vocoder (ADV) is provided which is at once versatile, capable of polymodal operation, obsolecence-resisting, compatible with present day vocoders and capable of continued compatibility with future vocoders, and relatively compact in size. In addition, the ADV has a favorable cost comparison with the single mode, non-adaptive vocoder of conventional design. These desirable features and advantages of the present invention are accomplished by provision of a vocoder employing a novel digital iterative computational process which permits the replacement of all parallel processing channels customarily employed in channel vocoders by a single sequential processing channel utilizing programmable components. Rapid change can be effected from one configuration to another by electronically varying one or more of the following parameters: transmission bit rate, number of spectrum channels, number of coding levels per spectrum sample, number of coding levels per pitch sample, number of coding levels per voice amplitude parameter sample, and center frequency, bandwidth and transfer characteristics of channel filters.

It is therefore a primary object of the present invention to provide a novel adaptive digital vocoder (ADV) in which critical vocoder parameters can be rapidly readjusted in accordance with variations in vocoder environment.

It is a further object of the present invention to provide a channel vocoder system wherein the several conventional channels including band pass filters are eliminated and replaced by a single channel including digital Fourier transform means for selective sampling of the speech wave spectrum.

It is another object of the present invention to provide a novel vocoder which, through appropriate programming, can measure the characteristics of the user's voice and correlate these measurements with the characteristics of the operating environment of the vocoder to produce an internal variation in its configuration and parameters in an effort to obtain the best possible match therebetween.

Briefly describing a preferred embodiment of the present invention, an adaptive digital vocoder for coding, transmitting, and reconstructing an arbitrary band-limited speech wave comprises means for deriving from the speech wave a plurality of analog signals representative of amplitude, frequency and phase thereof relative to a preselected reference signal, means for sampling the analog signals to generate therefrom streams of words each containing a predetermined number of sequential pulses having parameters indicative of the information conveyed by the analog signals, Fourier transform means for deriving from the word streams digital representations of the amplitude and phase spectra of the incoming speech wave in the form of a plurality of discrete spectral density signals, thereby effecting a conversion from time to frequency domain, converter means for compressing the plurality of spectral density signals into a smaller number of signals representing mean spectral density samples of the incoming speech wave, means for detecting voiced and unvoiced sounds in the speech wave and for generating signals indicative thereof, means for deriving pitch signals representative of the fundamental pitch frequency of the voiced sounds in the speech wave, and means for sequentially transmitting the voiced/unvoiced signals, pitch signals and mean spectral density signals in a digital format to a speech synthesizing receiver station for reconstruction of the original speech wave therefrom.

Because of its novel digital iterative processing technique the ADV permits an extremely rapid change in vocoder parameters to effect a desired change or changes in vocoder configuration by simply programming a variation of one or more of the appropriate basic parameters described above. The approach utilized emphasizes an early conversion of the input speech waveform to a digital format to permit substantially all processing operations to be performed digitally so that an almost unlimited flexibility is achieved in defining these operations. Hence, in addition to its capability of rapid variation of one or more basic parameters as noted above, such procedures as measuring pitch frequency, making voiced/unvoiced decisions, synthesis of original speech waveform, etc., are also adapted to ready modification through the simple reprogramming of the digital operations.

Because of the substantially complete digital operation of the adaptive digital vocoder, future developments in vocoder design can be incorporated almost immediately as they occur, again through proper programming of the necessary operations as prescribed by these developments. Such a feature is obviously a considerable hedge against obsolescence. Moreover, the digital processing by the vocoder permits extensive use of integrated circuitry to provide a compact, low cost, yet efficient unit.

It is accordingly a further object of the present invention to provide a vocoder which utilizes digital iterative computational processing of an incoming speech waveform for transmission and reconstruction thereof.

Another object of the invention is to provide a vocoder utilizing a digital Fourier transform network capable of selective extraction of spectrum samples from a speech wave.

It is a more specific object of the present invention to provide a speech transmission system in which analog signals are derived from the incoming speech wave and are subsequently processed to generate therefrom a stream of digital words representative of amplitude of spectral components of frequency, averaged over variable intervals to compress the spectral density data into a narrow transmission band, and at the receiving station to reconstruct the original speech wave from the compressed information in conjunction with transmitted pitch information and voiced/unvoiced information.

It is a further object of the present invention to provide methods of analysis and synthesis of a complex waveform.

Another object of the invention resides in provision of improved methods for encoding and processing speech waves to enhance subsequent reconstruction thereof.

The above and still further objects, features and attendant advantages of the present invention will become apparent from a consideration of the following detailed description of one specific embodiment thereof, especially when taken in conjunction with the accompanying drawings in which.

Figure 3A:
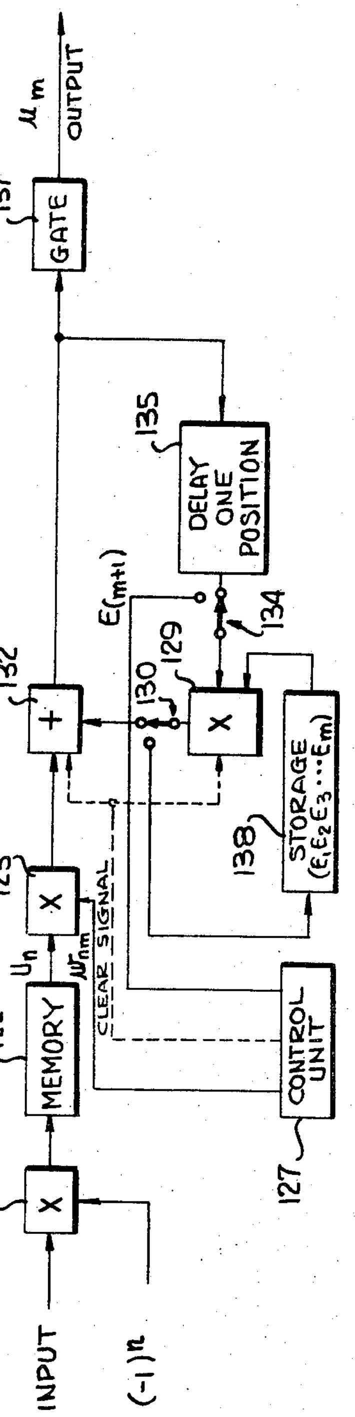
Figure 3B:
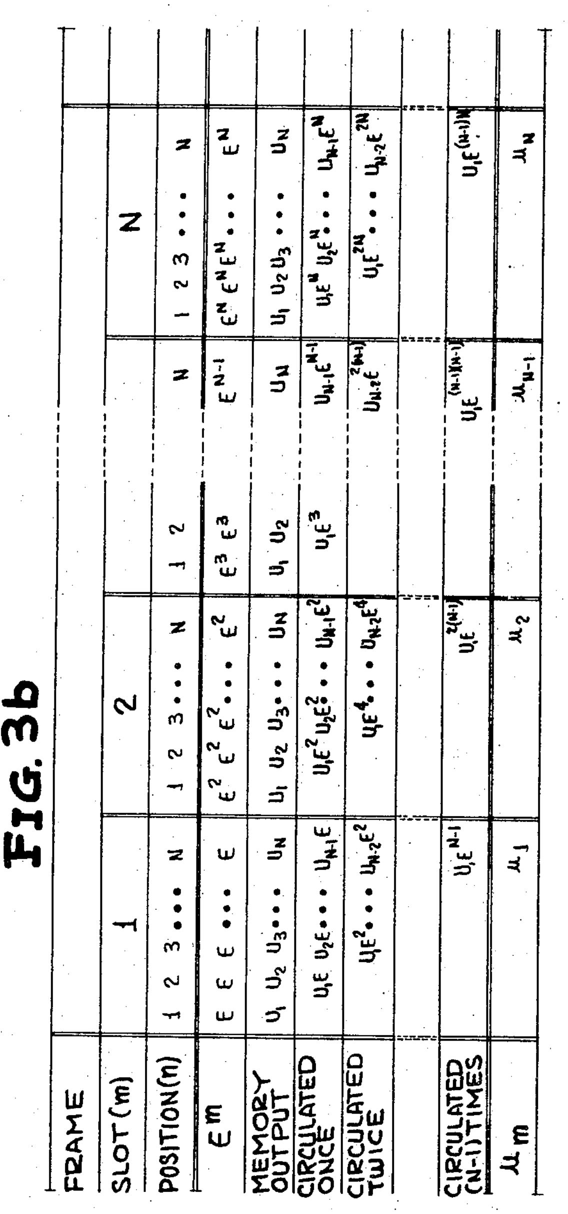
Figure 4A:
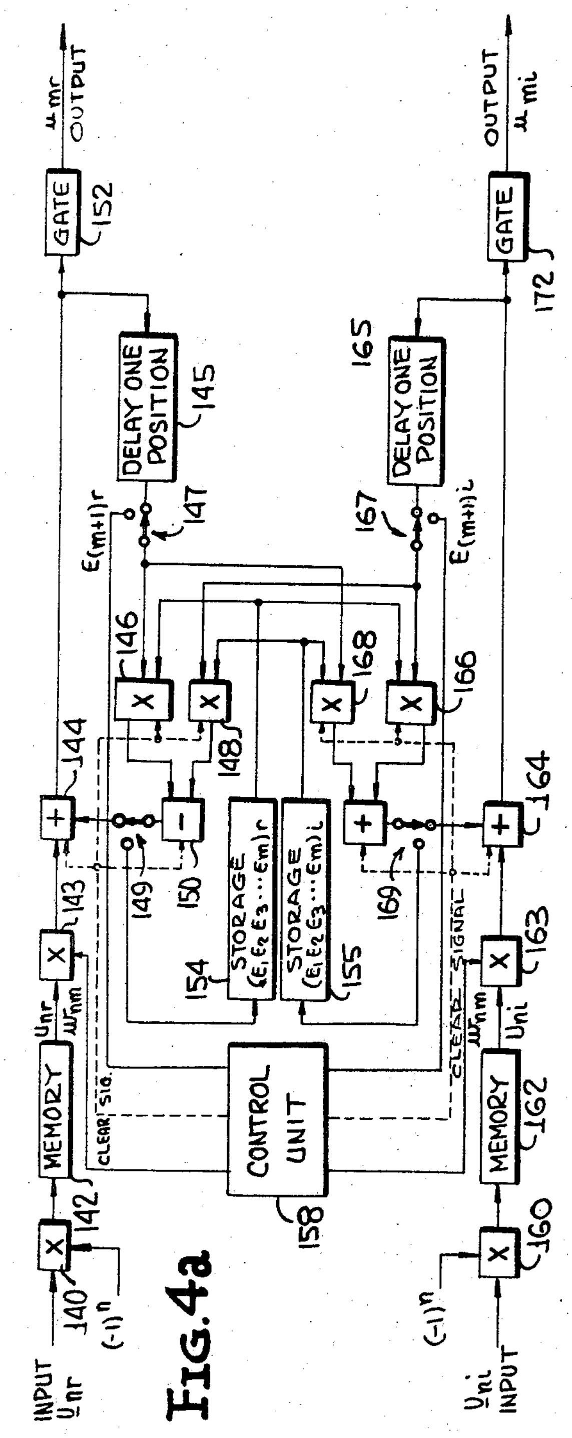
Figure 5:
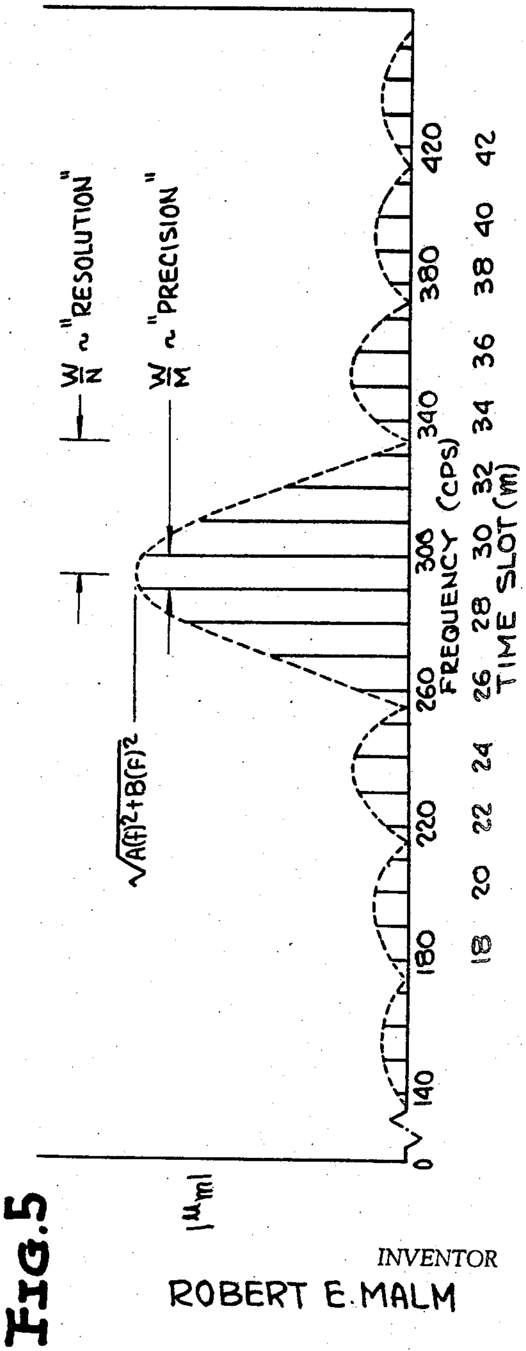
Figure 4B:
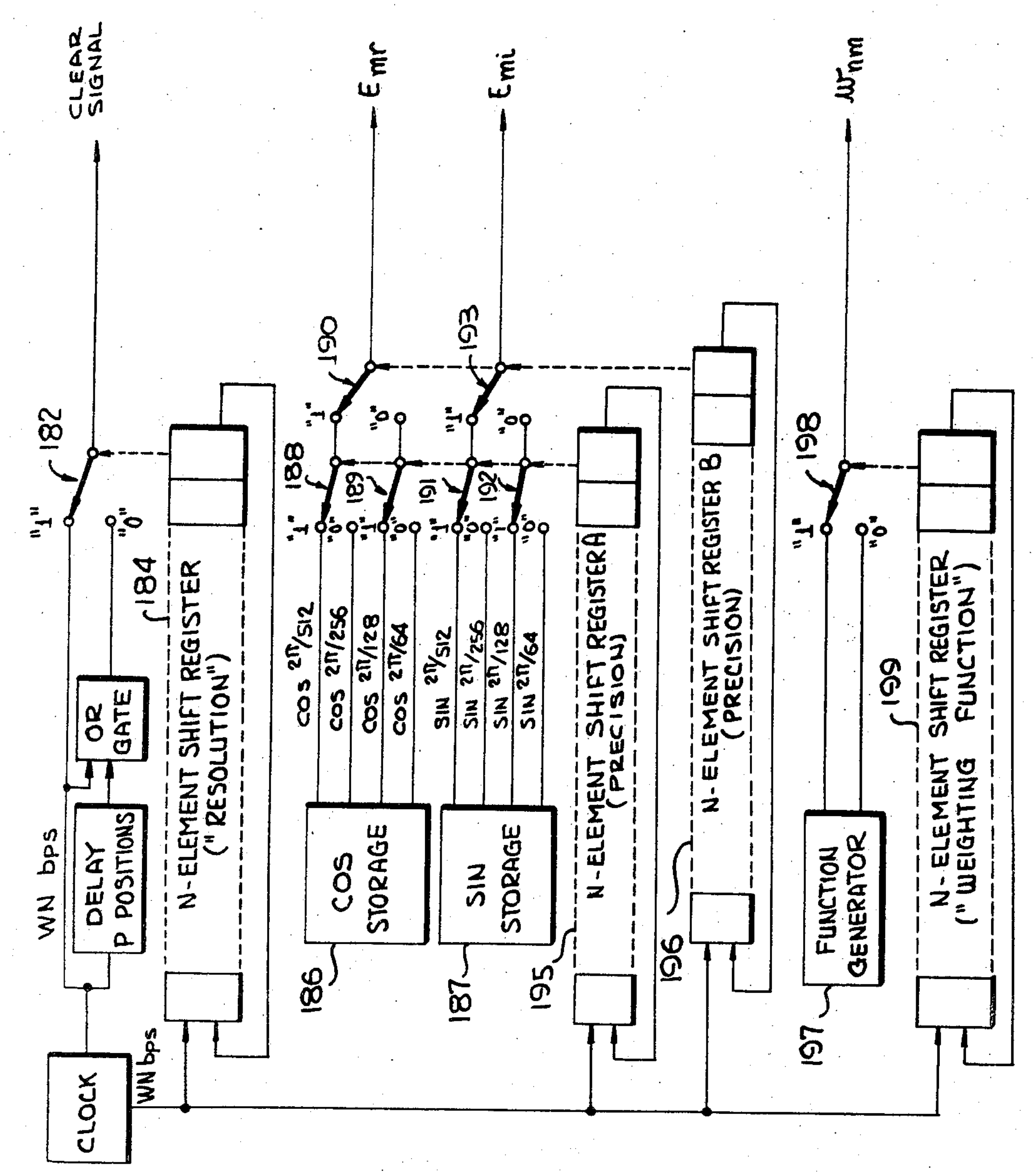
Figure 6:
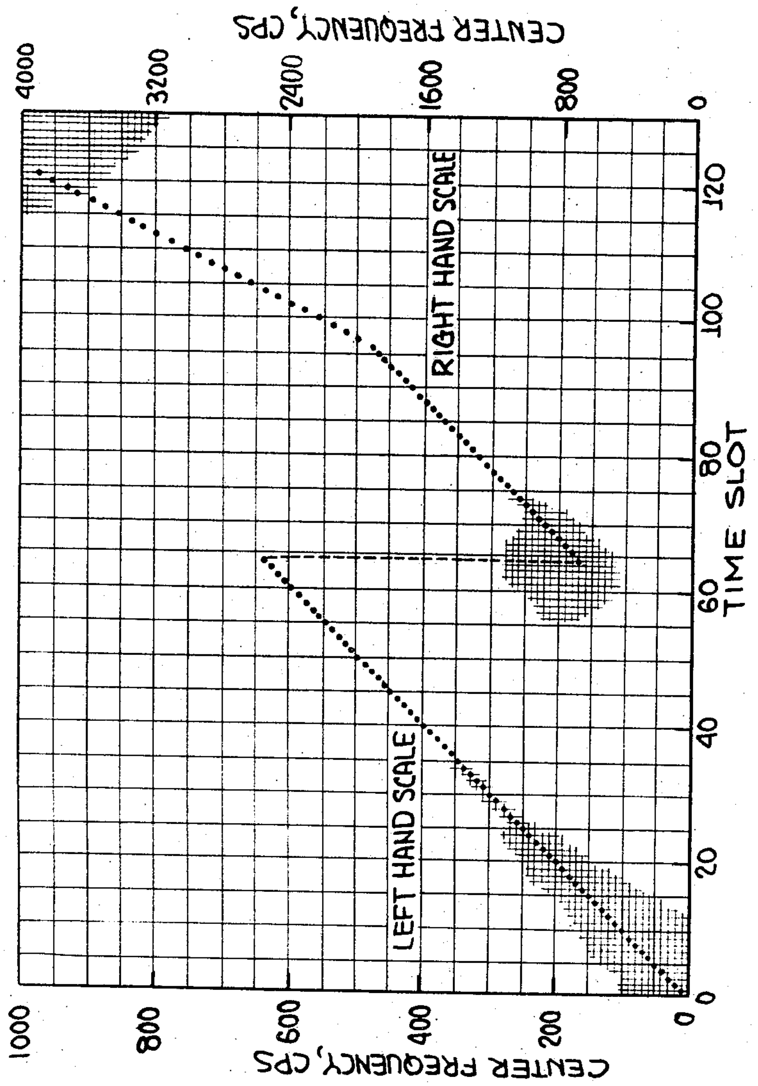
Figure 8:
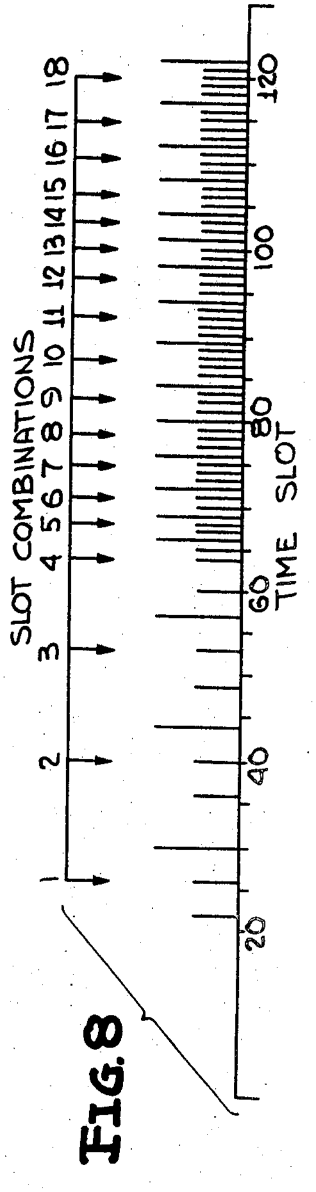
Figure 7:
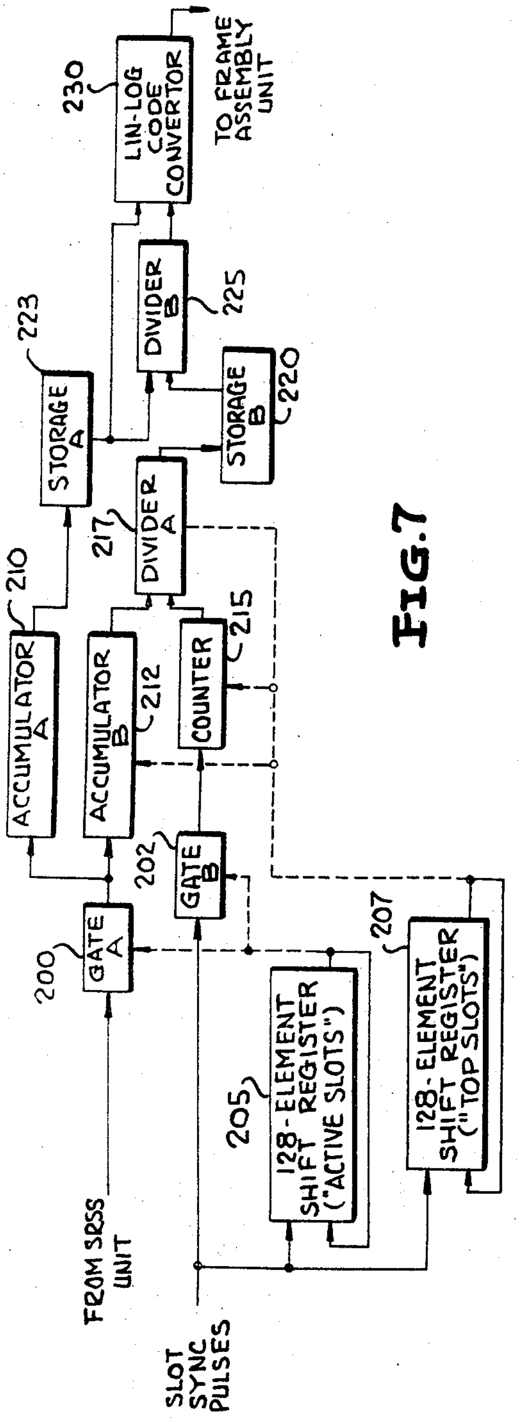
Figure 9:
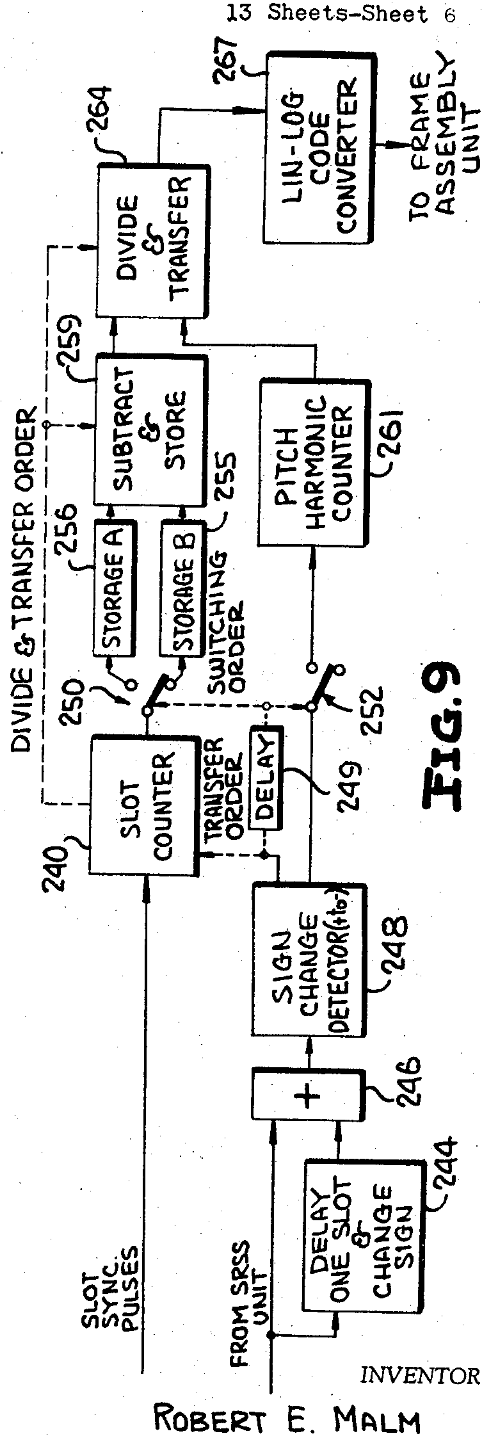
Figure 10:
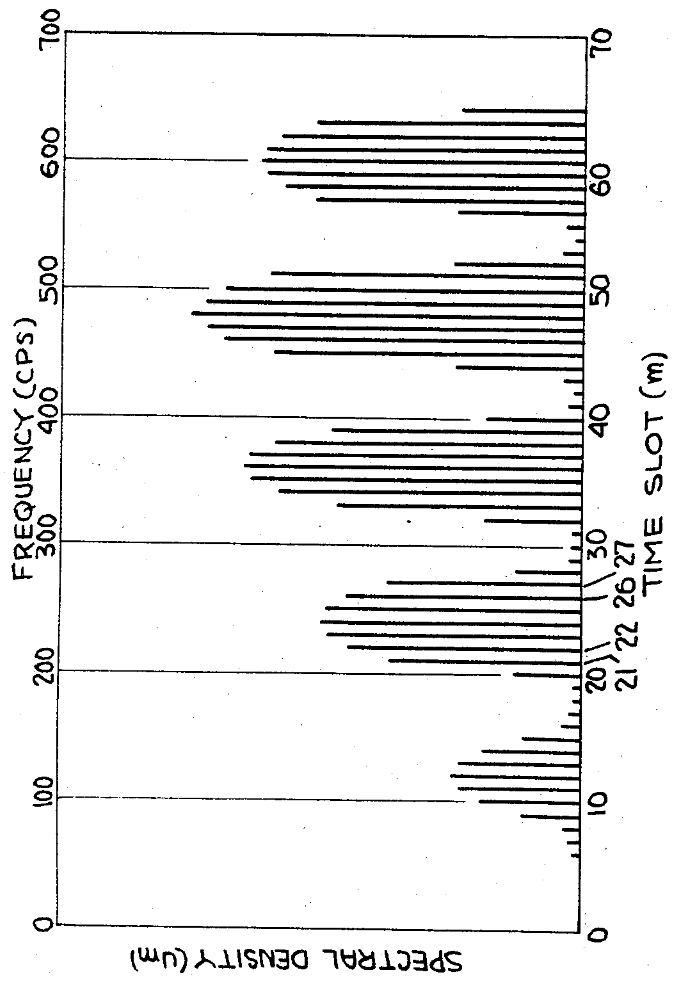
Figure 11:
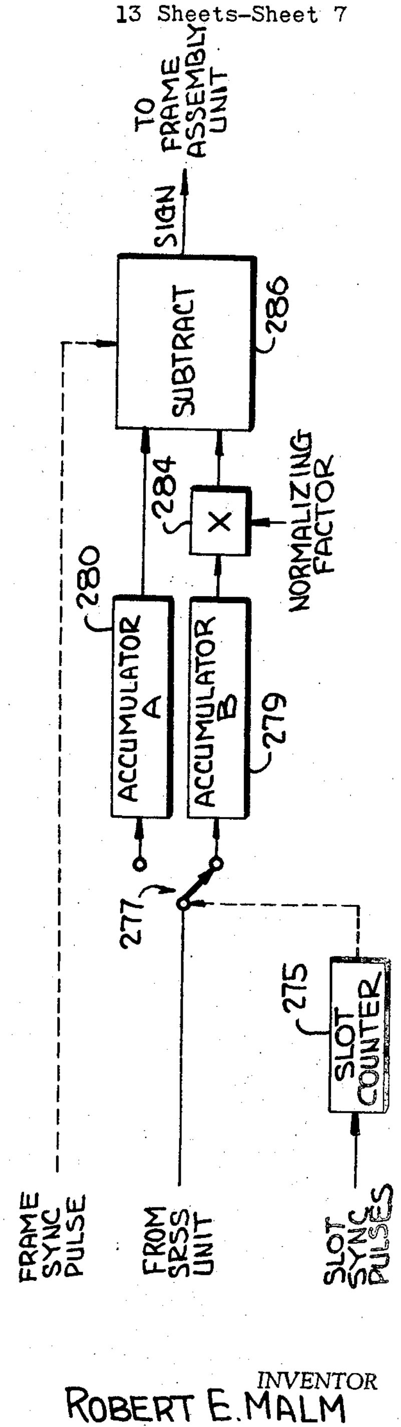
Figure 12:
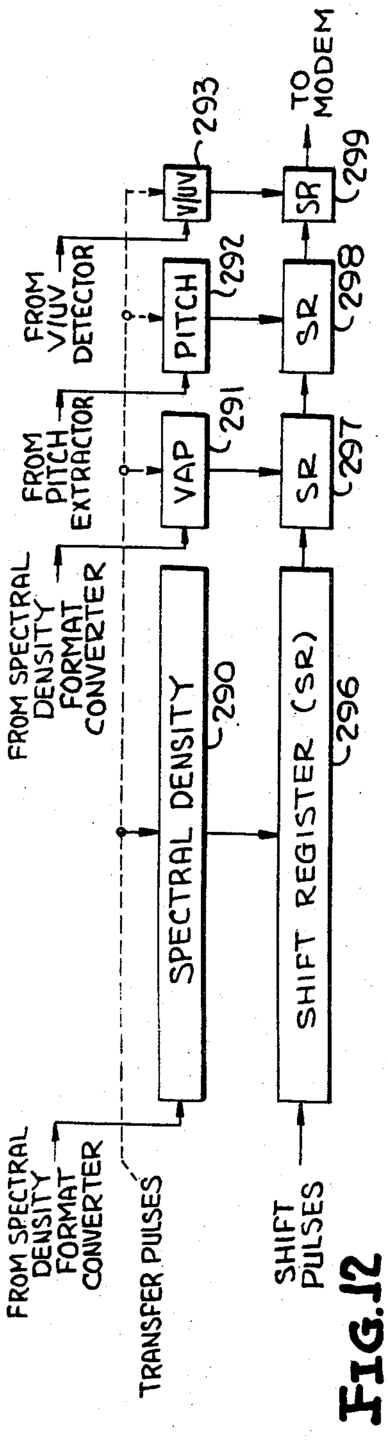
Figure 13:
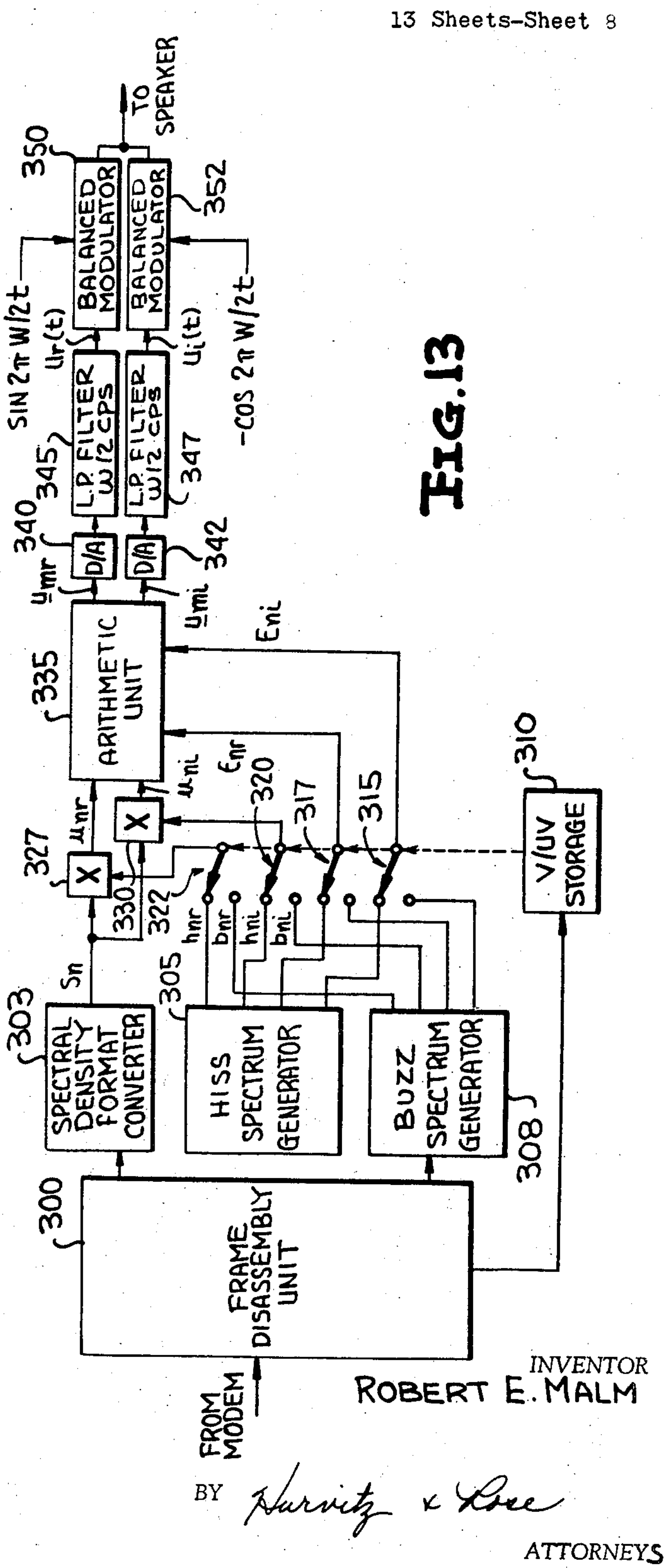
Figure 15:
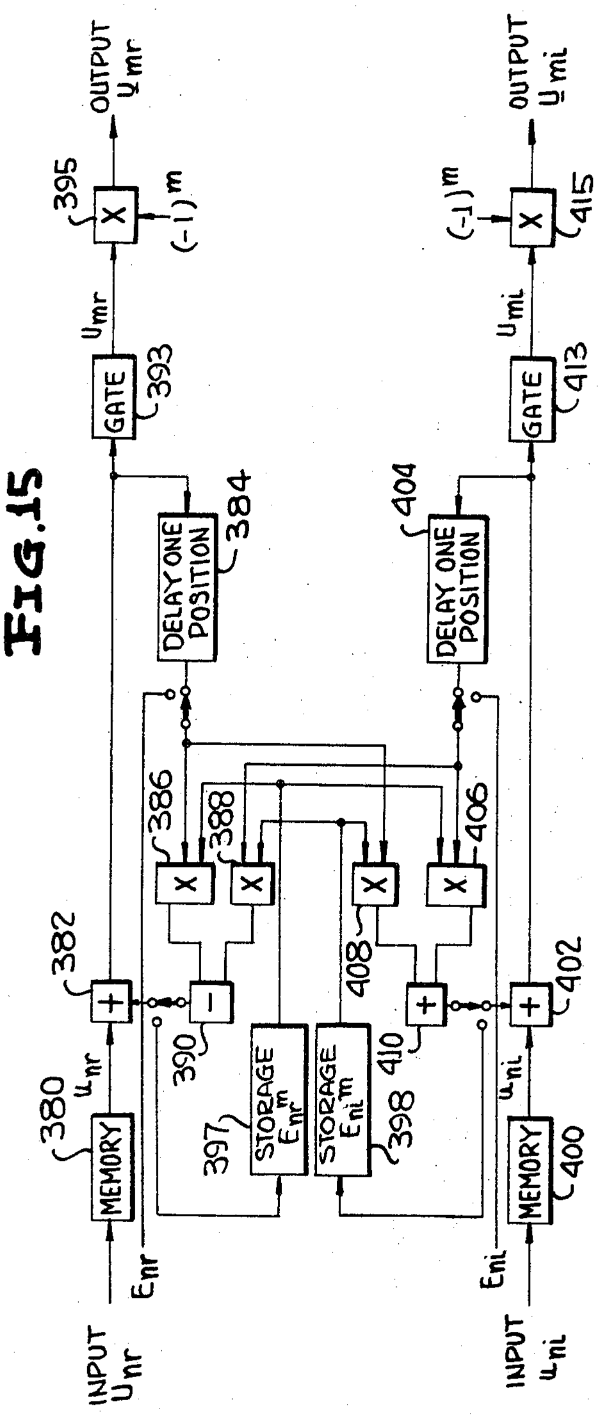
Figure 16:
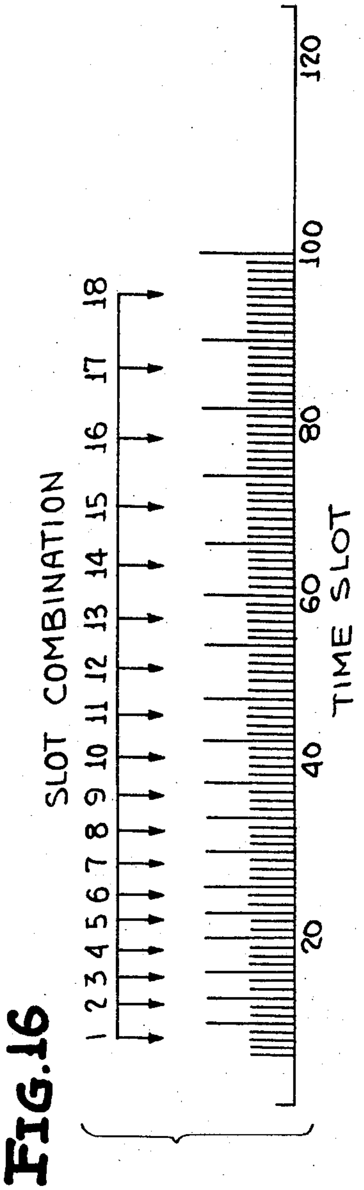
Figure 17:
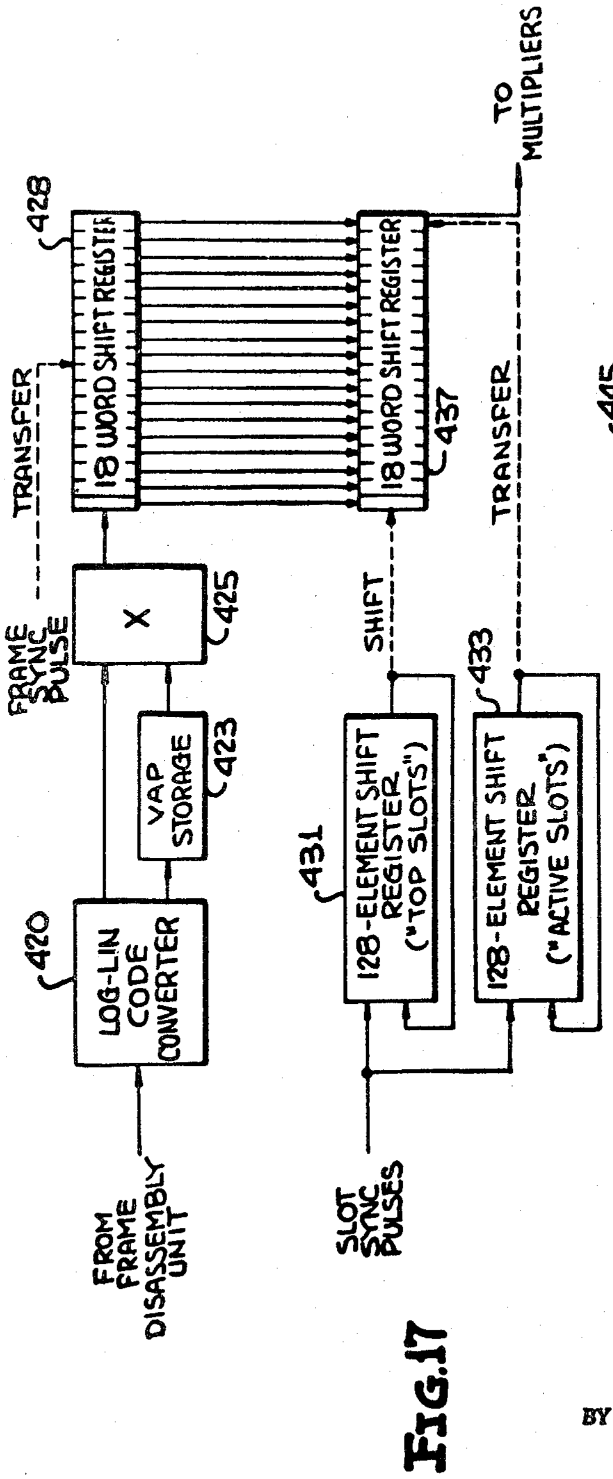
Figure 18:
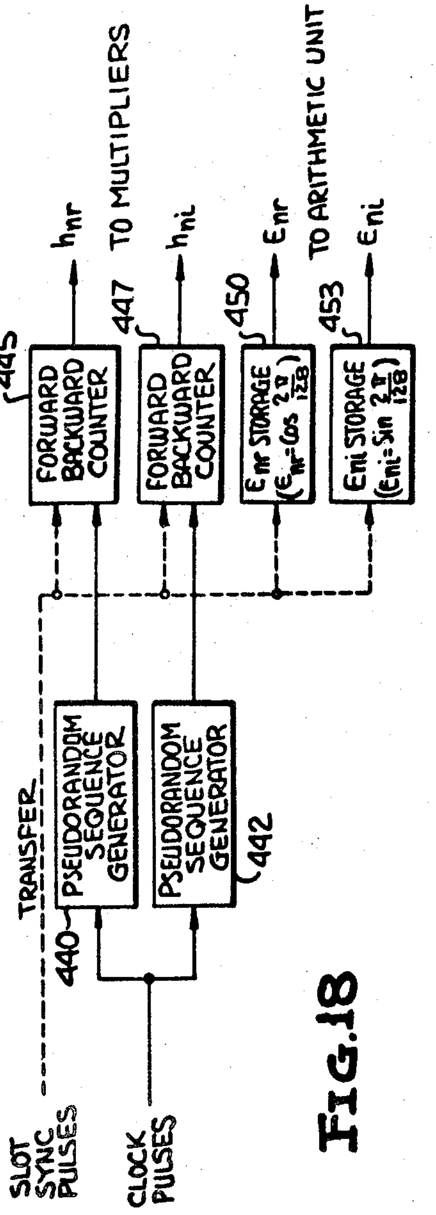
Figure 19:
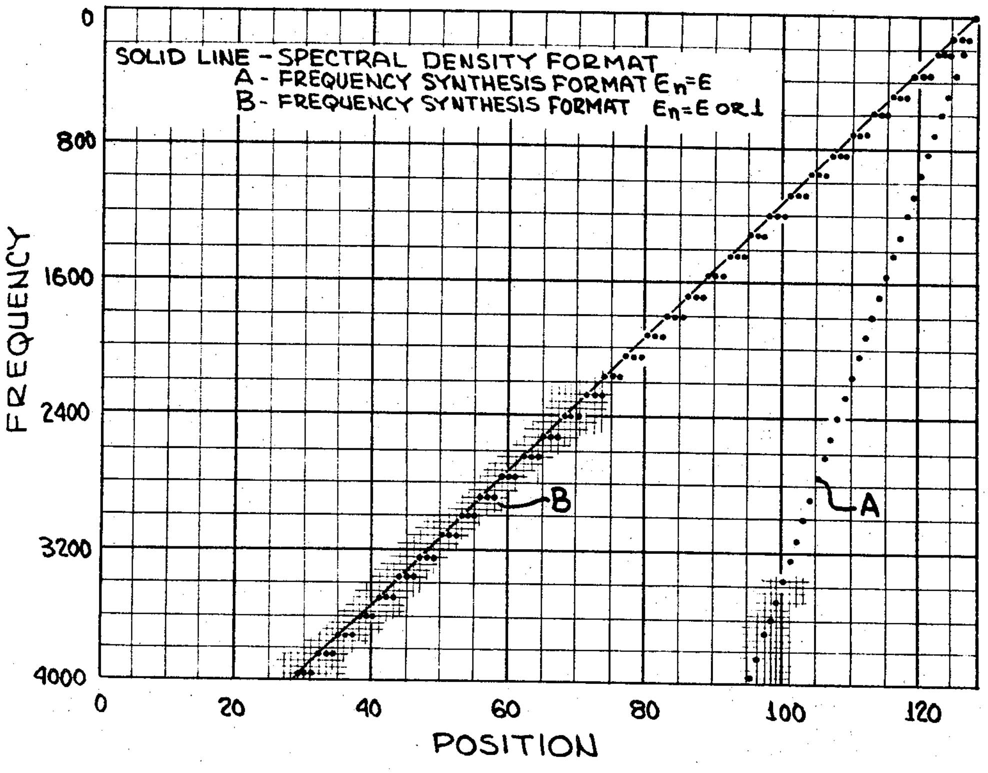
Figure 20:
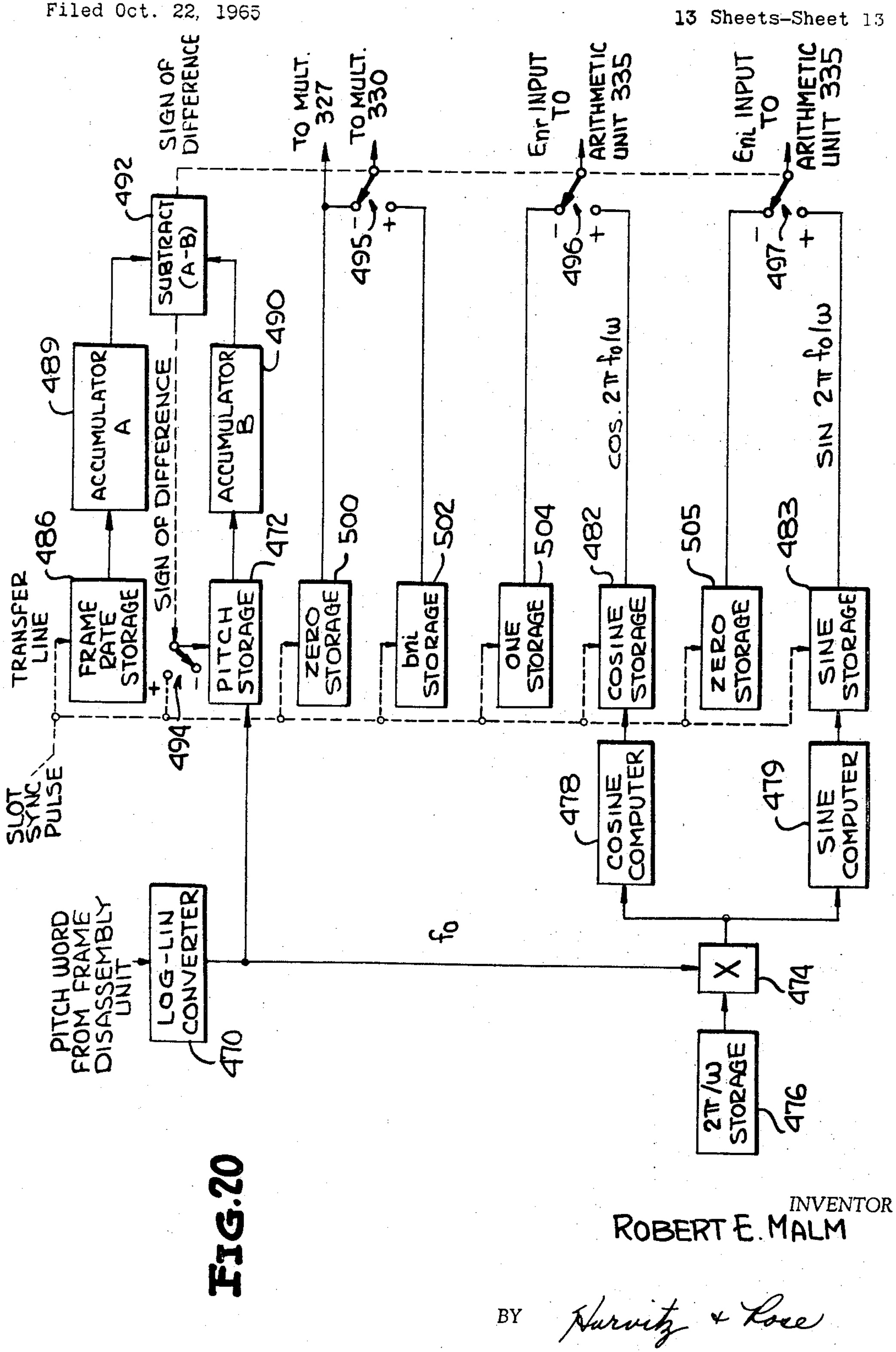

FIGURES 3*a* and 3*b* relate to the structure and operation of an arithmetic unit for processing complex word streams in the analyzer section of the adaptive digital vocoder;

FIGURE 4*a* is a block diagram of the structure of an arithmetic unit for processing real word streams in the analyzer section of the vocoder;

FIGURE 4*b* is a block diagram of a control unit suitable for use in the arithmetic unit of FIGURE 4*a*;

FIGURE 5 is a graph of the spectrum analysis for a single sinusoidal input to the analyzer section;

FIGURE 6 is a graph of time slot versus center frequency for the spectrum analysis selection or programming of the arithmetic unit of the analyzer;

FIGURE 7 is a block diagram of a spectral density format converter of the analyzer section;

FIGURE 8 is a chart representing one of the several possible conversion operations of the spectral density format converter of FIGURE 7;

FIGURE 9 is a block diagram of a pitch extractor in the analyzer section;

FIGURE 10 is a graph of voice spectral density for explaining the operation of the pitch extractor;

FIGURE 11 is a block diagram of the voiced-unvoiced detector of the analyzer section;

FIGURE 12 is a block diagram of the analyzer frame assembly unit;

FIGURE 13 is a block diagram of the synthesizer section of the adaptive digital vocoder;

FIGURES 14*a* and 14*b* relate to the structure and operation of one embodiment of the synthesizer arithmetic unit;

FIGURE 15 is a block diagram of the synthesizer arithmetic unit for processing real word streams;

FIGURE 16 is a chart indicating one possible selection of time intervals in the operation of the spectral density format converter shown in block diagrammatic form in FIGURE 17;

FIGURE 18 is a block diagram of a hiss spectrum generator for the synthesizer section; and FIGURE 19 is a graph representing the frequency synthesis formats selected for the buzz spectrum generator shown in block diagrammatic form in FIGURE 20.

*Overall system*

Figure 1:
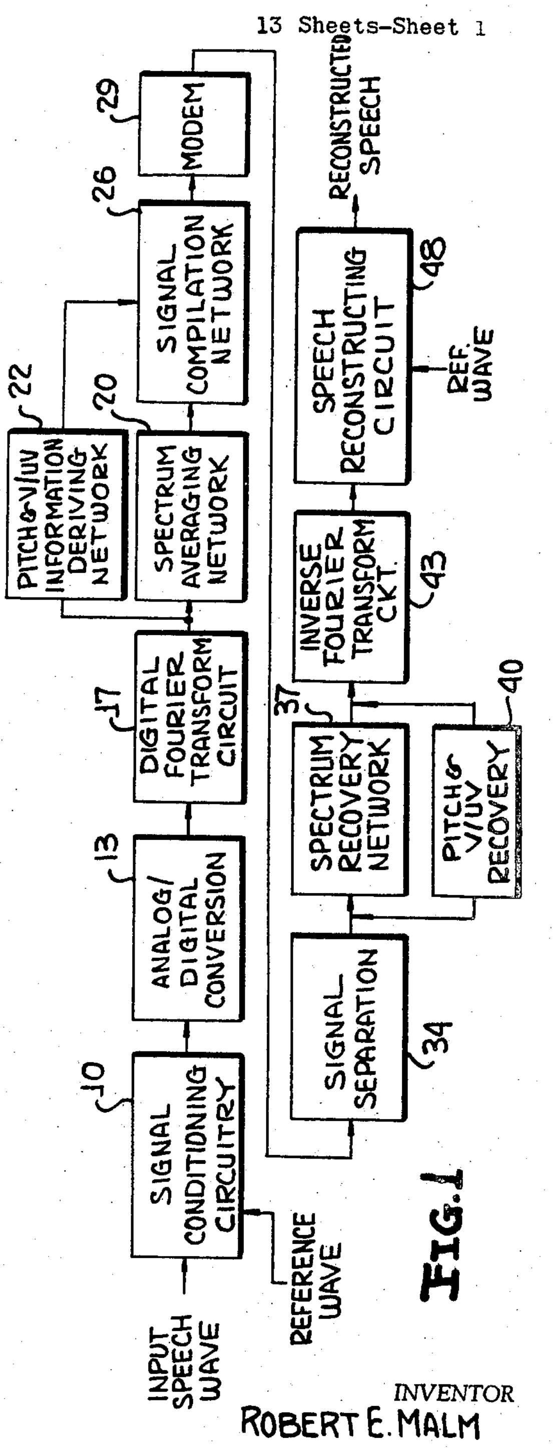
FIGURE 1 is a block diagram of the overall adaptive digital vocoder system.

Referring to FIGURE 1, the incoming speech wave is applied, together with a reference waveform, to signal conditioning circuitry 10 which operates to provide at its output two analog signals that are functions of its two input signals. The analog signals are digitized by A/D converter 13 and the multi-bit words, representing any designed number of desired levels are multiplexed into a single word stream and applied to digital Fourier transform device 17.

Device 17 is responsive to the digital word stream to provide discrete samples of the complex value of the amplitude spectrum of the incoming speech wave therefrom. A square-root-of-the-sum-of-the-squares operation is performed on the real and imaginary values of the amplitude spectrum and the resulting absolute values are fed in sequence to a spectrum averaging network 20, which derives mean amplitude spectral density signals from selected groups of sequential samples, and to pitch and voiced/unvoiced information deriving network 22, which determines whether the sound is voiced or unvoiced and extracts the pitch characteristic of voiced sounds in the speech wave from the spectrum samples.

The mean spectral density data voiced/unvoiced information and pitch information are placed in appropriate transmission format by signal compilation network 26 and the format applied to modem 29 (which includes the transmission link). The output of network 26 represents the desired analysis of the incoming speech wave, and the components beginning with signal separation network 34 and ending with speech reconstruction circuit 48 constitute the synthesizer portion of the vocoder.

The spectrum recovery network 37 and pitch and voiced/unvoiced recovery unit 40, operate in concert to provide the desired spectrum samples to inverse digital Fourier transform circuit 43. The output multi-digit complex word stream from circuit 43 is then applied to speech reconstructing circuit 48 for appropriate digital-to-analog conversion and recombination with the necessary reference wave. The reconstructed speech wave may be applied to any suitable electroacoustic transducer, such as a loudspeaker, for reproduction of the original speech.

*ADV analyzer*

Figure 2:
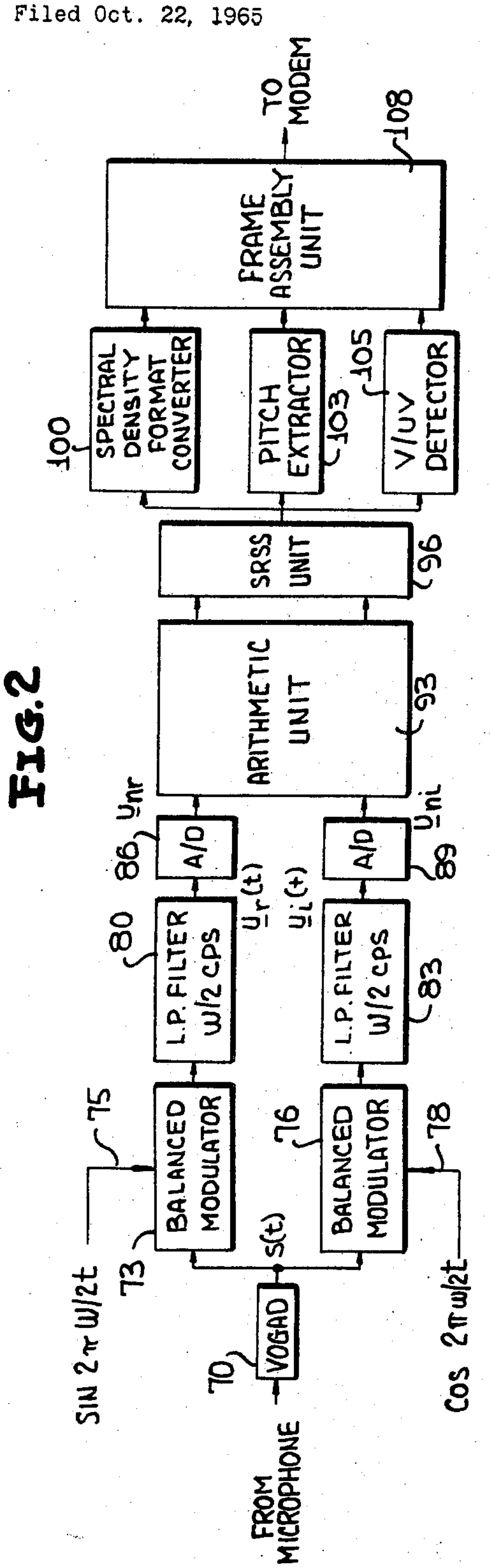
FIGURE 2 is a block diagram of the vocoder analyzer section.

Referring again to the drawings, FIGURE 2 illustrates, in block diagrammatic form, the analyzer section of an adaptive digital vocoder in accordance with the present invention. Except as otherwise indicated in the ensuing description, each individual component of the overall system is of conventional design, the innovations attributable to the vocoder lying primarily in the overall system itself rather than in its divisible parts.

The incoming speech wave, deriving, for example, from a microphone, is applied to a conventional voice-operated gain-adjusting device (vogad) 70, which operates as a volume compressor to maintain a nearly constant signal level at its output.

In a typical form, vogad 70 may comprise a linear amplifier the gain of which is controlled by the mean square of the waveform applied at its input, averaged over a predetermined time interval on the order of, say, 25 milliseconds, to provide the desired substantially constant signal level output.

The output signal obtained from vogad 70 may be specified, for purposes of illustration, as a sinusoid S($t$) of frequency $f$ where $$S(t)=A(f)\sin 2\pi ft+B(f)\cos 2\pi ft \quad (1)$$

A($f$) and B($f$) being well known representations of the amplitudes of the sine and cosine components respectively of the wave at a particular frequency. This does no violation to the more generalized cases since the ADV analyzer is linear, so that using the principle of superposition the results obtained may be generalized to the more interesting case of an arbitrary band-limited signal applied at the input.

Signal S($t$) is applied in parallel to a pair of conventional balanced modulators 73 and 76, each of which is operative, in a known fashion, to form the product of the signals injected at the two input terminals thereof. To this end, a sine function and a cosine function of frequency $W/2$ are applied respectively from suitable function generators as the second input signal to balanced modulators 73 and 76, the other input, of course, being the signal S($t$). Hence, the output signal obtained from each modulator under these conditions consists of a pair of sinusoids having sum and difference frequencies $f+W/2$ and $f-W/2$, respectively. W is selected to be greater than the highest anticipated frequency contained in the input signal (i.e., the speech wave).

Low pass filters 80 and 83 to which the product signals of modulators 73, 76 respectively are applied, each have a bandwidth of $W/2$ to reject the upper frequencies, i.e., $f+W/2$, so that the output signals, designated $\underline{U}_r(t)$ and $\underline{U}_i(t)$, respectively, of the two filters, are defined by the expressions $$\underline{U}_r(t)=A(f)\cos 2\pi(f-W/2)t-B(f)\sin 2\pi(f-W/2)t$$
$$\underline{U}_i(t)=A(f)\sin 2\pi(f-W/2)t+B(f)\cos 2\pi(f-W/2)t \quad (2)$$

Each of these signals is supplied to a separate conventional analog-to-digital converter (A/D) 86, 89, which operates to sample its respective input signal at intervals of time equal to one-half the reciprocal of the frequency of the reference waves, $1/W$ in this case, to thus provide a discrete (quantized) pattern of pulses. Each of the A/D converters is designed to produce a stream of $k$-bit words, where $k$ is a number which will depend upon the number of discrete pulse levels desired, in general $b^k$ levels being achievable with a $k$-digit $b$-base number system. With the $n$th samples issuing from the A/D converters 86 and 89 being denoted respectively by $\underline{U}_{nr}$ and $\underline{U}_{ni}$, the mathematical representation is $$\underline{U}_{nr}=A(f)\cos 2\pi\frac{n(f-W/2)}{W}-B(f)\sin 2\pi\frac{n(f-W/2)}{W}$$
$$\underline{U}_{ni}=A(f)\sin 2\pi\frac{n(f-W/2)}{W}+B(f)\cos 2\pi\frac{n(f-W/2)}{W} \quad (3)$$

It is notable that up to this point the analyzer components have been effective to convert an input analog signal into two $k$-bit word streams suitable for digital processing, and that, thus far, the only constraint which has been placed upon the system operation is the restriction of the input signal (speech wave) bandwidth to something less than W. It will be apparent to those skilled in the art, therefore, that any vocoder changes which may be necessary or desirable to facilitate adaption to a particular application do not require adjustment or modification of the analog circuitry.

It becomes necessary at this juncture to obtain a digital representation of the amplitude spectrum of the input signal S($t$), i.e., to determine the spectral content of S($t$). This is achieved in accordance with the present invention by an arithmetic unit which constitutes one of the most important elements of the invention. Arithmetic unit 93 operates, in providing the desired digital representation of the spectrum, as a digital Fourier transform device. In discussing its operation, concurrent reference will be made to FIGURES 3$a$ and 3$b$, the former figure showing, in block diagrammatic form, an exemplary arithmetic unit where, for purposes of clarity and convenience, the two input words streams $\underline{U}_{nr}$ and $\underline{U}_{ni}$ are represented by a single complex word stream $\underline{U}_n$ where $$\underline{U}_n=\underline{U}_{nr}+j\underline{U}_{ni} \quad (4)$$

and the latter figure providing a tabular representation of the operational sequence of the unit. While complex number notation is employed in the discussion of the two figures for reasons of simplicity, an embodiment of an arithmetic unit suitable for processing the original real-word streams $\underline{U}_{nr}$ and $\underline{U}_{ni}$ will be described presently.

Substituting the expressions (3) for $\underline{U}_{nr}$ and $\underline{U}_{ni}$ in Equation 4

$$\underline{U}_n=[A(f)+jB(f)]\exp\left[j2\pi n\frac{(f-W/2)}{W}\right] \quad (5)$$

where use has been made of the fundamental identity $e^{j\omega t}=\cos \omega t+j\sin \omega t$.

The complex word stream $\underline{U}_n$ is applied as an input to a multiplier 120 wherein the sign of the odd numbered samples is changed by feeding a $(-1)^n$ signal from any suitable function generator to the second input of the multiplier at intervals corresponding to the sampling period. Hence, with the output of multiplier 120 denoted by $U_n$, the product obtained is $$U_n=(-1)^n\underline{U}_n$$

or, what is the same thing $$U_n=\exp\left(j2\pi n\frac{W/2}{W}\right)\underline{U}_n \quad (6)$$

since $$(-1)^n=\exp(j\pi n)=\exp\left(j2\pi n\frac{W}{2W}\right)=\exp\left(j2\pi n\frac{W/2}{W}\right)$$

Substituting (5) into (6)

$$U_n=[A(f)+jB(fQ]\exp(j2\pi nf/W) \quad (7)$$

The words thus derived are divided into frames of data each containing N words, the frame period being equal to $N/W$. A frame of data is read into memory unit 122 during one frame period while simultaneously therewith the data read into the memory during the previous frame period is repetitively read out in sequence at N′ times the input rate. Memory 122 may comprise a conventional magnetic or non-magnetic storage unit whose capacity is sufficient to store the two N words constituting two frames of data. Since random access storage is not required, i.e., storage in which the location of items of stored information may be selected for read out of contents in random fashion with equal facility of access to each selected location, memory 122 may comprise simply an "input-output" unit rather than an "addressable" unit.

To provide the desired filter characteristic for a particular application of the present invention, the data read out of the memory is applied to a multiplier 125 for multiplication by a "weighting function" $w_{nm}$ generated by control unit 127 and applied to the other input terminal of the multiplier 125. The output of multiplier 125 is added to the output of a further multiplier 129, via switch 130, by adder 132, all of conventional type.

Multiplier 129 is provided with one input, via switch 134, from a one-position delay unit 135 which is coupled, in parallel with gate 137, to the output terminal of adder 132. The other input data applied to multiplier 129 is the product ($\epsilon_1\epsilon_2\epsilon_3\ldots\epsilon_m$), a complex number (where $m$=slot number) obtained from storage unit 138. Storage 138 may, like memory 122, comprise an "input-output" magnetic or non-magnetic data storage medium. A suitable embodiment of one-position delay unit 135, for example, is a delay line whose delay time is equal to a position interval, or a one-stage shift register responsive to shift pulses corresponding to position sync pulses so that the output of the register is at all times the data word occupying the immediately preceding position. Gate 137 may comprise an AND gate to which slot sync pulses are applied to sequentially gate the output of adder 132 as an output of the arithmetic unit for each succeeding slot interval.

For convenience as well as simplicity and clarity in describing the operation of the arithmetic unit, the particularly simple situation is chosen in which the number of slots N′ is equal to the number of positions N; the weighting function $w_{nm}$ is identically equal to one for all values of $n$ and $m$, i.e., a situation which corresponds to applying the output of memory 122 directly to adder 132; and the parameter $\epsilon_m$ is equal to a complex constant $\epsilon$ for all values of $m$. The constant $\epsilon$ is placed in storage 138 in any conventional manner at the beginning of the frame period under consideration. The memory 122 output is added to the output of multiplier 129 (which is zero at the start of a frame period), delayed by one position, multiplied by $\epsilon$, and added to the output of memory 122. The process is repeated and it will be observed from FIGURE 3$b$ that $u_1$, the content of the adder 132 at the Nth position of the first slot ($m=1$), is $$u_1=\sum_{n=1}^{N}U_n\epsilon^{N-n} \quad (8)$$

To calculate the product of the $\epsilon_m$'s for providing the proper stored quantity in storage 138 during a particular slot period, a small amount of time is reserved, at the conclusion of each slot period and prior to the beginning of the immediately succeeding slot period, during which each of switches 130 and 134 is actuated from its respective position shown in FIGURE 3$a$ to its other position. This provides inputs to multiplier 129, during the $(m+1)$th slot period for example, of $\epsilon_{m+1}$ and $\epsilon_1\epsilon_2\epsilon_3\ldots\epsilon_m$ to form the product $\epsilon_1\epsilon_2\epsilon_3\ldots\epsilon_m\epsilon_{m+1}$ which is substituted for $\epsilon_1\epsilon_2\epsilon_3\ldots\epsilon_m$ in storage 138. The switching may be accomplished in any conventional manner appropriate to the type of switches employed in the arithmetic unit. It will be understood that the switches may be electrical, mechanical, electromechanical, electromagnetic, etc., the particular type being immaterial to the essence of the invention and being readily apparent and available to the routineer. Suitable switch actuation means (not shown) will also be readily apparent, for example, the energization of a coil associated with each switch during the required time interval where electromechanical switches are employed. Timing signals may likewise be provided in any conventional manner for the various timing functions required in the illustrative embodiment.

Continuing with the description, after the appropriate product is stored in unit 138 the switches are returned to their original positions and the calculation during the next slot period proceeds in the previously described manner. Thus $u_2$, the contents of adder 132 at the Nth position in the second slot is $$u_2=\sum_{n=1}^{N}U_n\epsilon^{2(N-n)} \quad (9)$$

In general, $u_m$, the contents of the adder at the Nth position of the $m$th slot is $$u_m=\sum_{n=1}^{N}U_n\epsilon^{m(N-n)} \quad (10)$$

Expression (10) may be further generalized to include arbitrary choices for the weighting function $w_{nm}$, the complex parameter $\epsilon_m$, and the read-in read-out rates N and N′, respectively, by the expression $$u_m=\sum_{n=1}^{N}U_nw_{nm}(\epsilon_1\epsilon_2\epsilon_3\ldots\epsilon_m)^{(N-n)} \quad (11a)$$

$m=1, 2, 3, \ldots, N'$.

In particular, $\epsilon_m$ is a complex number with an absolute value equal to one $$\epsilon_m=\exp j\frac{2\pi}{M_m} \quad (11b)$$

where M is a design parameter which determines the precision with which the amplitude spectrum of input signal S($t$) is analyzed. This choice is purely an example since $\epsilon_m$ provides a control on the filter characteristic and may therefore be varied to suit a particular application, such as by utilizing an exponent having both real and imaginary components to produce the equivalent of an exponential weighting function. Substituting expression (11b) into expression (11a)

$$u_m=\sum_{n=1}^{N} U_n w_{nm} \exp\left\{\left[j2\pi\sum_{p=1}^{m} 1/M_p\right](N-n)\right\} \tag{11c}$$

and substituting (7) into (11c)

$$u_m=[A(f)+jB(f)]\exp\left[j2\pi\sum_{p=1}^{m} N/M_p\right]\cdot \sum_{n=1}^{N} w_{nm}\exp\left[j2\pi n\frac{\left\{f-\sum_{p=1}^{m}\frac{W}{M_p}\right\}}{W}\right] \tag{12}$$

To illustrate the manner in which parameter selection may be utilized to control filter characteristics two examples are considered. In the first example, a uniform weighting function is selected for which $w_{nm}$ is equal to one for all values of $n$ and $m$ and $M_m$ equals a constant M for all values of $m$. In such a case, when the summation indicated in Equation (12) is carried out $$u_m=[A(f)+jB(f)]\exp\left[j2\pi\frac{mN}{M}\right]\cdot \exp\left[j2\pi\frac{N+1}{2}\,\frac{f-m\frac{W}{M}}{W}\right]\frac{\sin\pi\dfrac{\left(f-m\frac{W}{M}\right)}{W/M}}{\sin\dfrac{\pi}{N}\dfrac{\left(f-m\frac{W}{M}\right)}{W/N}} \tag{13a}$$

At the end of each slot period the contents $u_m$ of adder 132 are gated out of the arithmetic unit to SRSS unit 96 (FIGURE 2) via gate 137, and all registers in the adder and in multiplier 129 are cleared, the latter operation being initiated by a clear signal from control unit 127, a specific embodiment of which will be considered in detail presently.

Before continuing with the aforementioned two examples of filter characteristic control, reference is made to FIGURE 4*a* wherein an embodiment of arithmetic unit 93 suitable for processing the two real-word streams is shown.

As was previously noted, the derivation of the output of the arithmetic unit 93 has proceeded on the basis of a complex word stream processed by the circuit embodiment of FIGURE 3*a*, with concurrent reference to the tabular format of FIGURE 3*b* indicating particular signal components at various points within that circuit. This has permitted a relatively simple and convenient explanation of the operation of the arithmetic unit. In a completely equivalent process, the arithmetic unit is constructed to develop separate outputs by separately processing the individual real-word streams $\underline{U}_{nr}$ and $\underline{U}_{ni}$ denoted by expressions (3).

This separate processing is accomplished in accordance with the present invention by provision of a circuit as shown in FIGURE 4*a*. Brief consideration of FIGURE 4*a* will indicate that the circuit represented thereby is functionally equivalent to the circuit shown in FIGURE 3*a*, with the exception of its dual channel form and certain minor modifications to obtain the proper multiplying factors for the delayed signal components in each feedback loop. Word streams $\underline{U}_{nr}$ and $\underline{U}_{ni}$, the real and imaginary parts of the complex word stream $\underline{U}_n$ considered above, are applied respectively to multipliers 140 and 160 where, as before, the output product components are identical to the initial word streams except for the change in sign of the odd-numbered samples, achieved by supplying a $(-1)^n$ function as a second input to each multiplier 140, 160.

Each word stream $\underline{U}_{nr}$ and $\underline{U}_{ni}$ is read into a separate memory unit, 142 and 162, respectively, in frames of N words. Again, the store ddata constituting one frame is read out of the respective memory units serially and repetitively at N′ times the input rate. The data words issuing from each memory 142 and 162 are multiplied by appropriately selected weighting functions $w_{nm}$ in respective multipliers 143, 163. After addition to signal components in adders 144 and 164, respectively, the resulting data is circulated through the associated feedback path for one-position delay, further processing, and reapplication to its respective adder. To this end, each feedback loop is provided with a delay unit 145, 165, having a delay time associated therewith which is equal to the interval between each word at the readout rate of the memory unit.

In addition, each feedback loop includes two multipliers (146, 148 and 166, 168, respectively), and a combiner (subtractor 150, adder 170, respectively). Referring to the processing channel of the arithmetic unit for the word stream $\underline{U}_{nr}$, the combiner (subtractor 150 in this case) has a pair of inputs, one derived from multiplier 146, which produces the product of the output of delay unit 145 and a function $(\epsilon_1\,\epsilon_2\,\epsilon_3\,\ldots\,\epsilon_m)_r$, the real part of complex number $(\epsilon_1\,\epsilon_2\,\epsilon_3\,\ldots\,\epsilon_m)$, of slot number $(m)$ obtained from a suitable function generator. The second input to the combiner is derived from multiplier 148, which produces the product of a $(\epsilon_1\,\epsilon_2\,\epsilon_3\,\ldots\,\epsilon_m)_i$, the imaginary part of complex number $(\epsilon_1\,\epsilon_2\,\epsilon_3\,\ldots\,\epsilon_m)$, also a function of slot number and the output data of delay unit 165 in the other channel (i.e. the channel in which imaginary component word stream $\underline{U}_{ni}$ is processed). The output of subtractor 150 is added to the data, occupying the next succeeding position, then being read out of memory unit 142. In FIGURE 4*a*, the quantities $\epsilon_1\,\epsilon_2\,\epsilon_3\,\ldots\,\epsilon_m)_r$ and $(\epsilon_1\,\epsilon_2\,\epsilon_3\,\ldots\,\epsilon_m)_i$ are calculated in a manner functionally equivalent to that previously described and shown with respect to FIGURE 3*a*, utilizing storage 154 and switches 147 and 149 in one channel, and storage 155 and switches 167 and 169 in the other. It will readily be seen that the computational procedure based on the use of real numbers as shown in FIGURE 4*a* is completely equivalent to that based on the use of complex numbers as shown in FIGURE 3*a*. By analogy, if the inputs to the arithmetic unit shown in detail in FIGURE 4*a* are the real and imaginary parts $\underline{U}_{nr}$ and $\underline{U}_{ni}$, respectively, of complex word stream $\underline{U}_n$, then the outputs of the unit 93 are the real and imaginary parts $u_{mr}$ and $u_{mi}$, respectively, of the sampled values $u_m$ of the spectrum.

An illustrative embodiment of control unit 158 suitable for use in the arithmetic unit 93 of FIGURE 4*a* is shown in detail in FIGURE 4*b*. A clock 180 provides output pulses at a rate of WN pulses per second (W and N having the previously defined values), which are fed directly to the "1" terminal of switch 182. The output pulses are also delayed by P positiones, combined with the undelayed pulses by means of an OR gate and fed to the "0" terminal of switch 182. Clock 180 also provides shift pulses at the WN pps rate for shifting the contents of four N-element of N-stage sift registers 184, 195, 196 and 199 of the recirculating type from stage-to-stage in sequential fashion. The contents of each shift register are present to effect the desired transition of switches 182, 188–193, and 198 according to whether the content of the last stage of each respective register at any given instant is a "1" or a "0", thereby determining which of the derived outputs of clock 180, cosine and sine storage units 186 and 187, and function generator 197 are to be applied as clear signal, $\epsilon_{mr}$, $\epsilon_{mi}$ and $w_{nm}$, respectively, to the appropriate units as indicated in FIGURE 4*a*. As will subsequently be further explained, the parameter P controls the clear signal timing and thereby the resolution and the complex number $\epsilon_m$ (having real and imaginary parts $\epsilon_{mr}$ and $\epsilon_{mi}$), determines the precision of the analyzed spectrum. The weighting functioin $w_{nm}$ operates as a control on the filter characteristics. Accordingly, appropriate selection of these parameters may be made to produce the desired analysis and this feature of the present invention is indicative of its flexibility and versatility in a variety of vocoder applications and environments.

A particular example of the manner of programming the operation of the arithmetic unit by means of the control unit will be described presently.

The two outputs $u_{mr}$ and $u_{mi}$ deriving from arithmetic unit 93 are applied to respective input terminals of SRSS (Square Root of the Sum of the Squares) unit 96 (FIGURE 2) which may be any well-known circuit capable of squaring its input signals, summing the squared signals, taking the square root of the sum, and thus producing the absolute value of $u_m$ at its output terminals. This is a common operation readily programmable in digital computer circuitry. See, for example, Richards, Arithmetic Operations in Digital Computers (Van Nostrand, 1955), chapter 12.

Returning now to the first example of analysis of the spectrum of the input signal and referring again to mathematical expression (13a), which denotes the completed summation in complex notation of the sample $u_m$, it is readily appreciated that the real and imaginary parts of $u_m$, which are respectively $u_{mr}$ and $u_{mi}$, when operated upon by SRSS unit 96, form an output from the latter which is the absolute value of $u_m$, or $$|u_m| = [A(f)^2 + B(^{1/2}f)^2 \left| \frac{\sin\left[\pi \frac{\left(f - m\frac{W}{M}\right)}{W/N}\right]}{\sin\left[\pi/N \frac{\left(f - m\frac{W}{M}\right)}{W/M}\right]} \right| \qquad (13b)$$

the exponential cross-products canceling out during the arithmetic operation.

Expression (13b), denoting the output of SRSS unit 96, represents a sampled value of the spectrum of the input signal $S(t)$, a different $|u_m|$ being derived at the conclusion of each slot period ($m=1, 2, 3 \ldots N$). The input signal $S(t)$ is a sine wave of finite duration, since consideration here is being given only to a segment of the wave, and consequently has a spectrum given by the sine $x/x$ envelope. However, as previously noted, the ADV analyzer is completely linear so that the superposition theorem is applicable, i.e., any arbitrary input signal $f(t)$, regardless of complexity, as illustrated by a speech wave, will result in a complex spectrum which is simply the algebraic sum of its real and imaginary components. Therefore, although operation of the analyzer section of the present invention is described with reference to a relatively simple waveform, viz., a sinusoid, the analyzer is operative to provide an analysis of the most complex speech wave.

The ADV analyzer, being a digital device, provides samples $u_m$ of the spectrum of the input speech wave at intervals of $W/M$, i.e., $W/M$=spectrum sampling interval. $W/M$ therefore is a limiting factor on the precision with which the position of the peak of the sine $x/x$ characteristic (in this example) can be determined. Similarly, $N/W$ is the frame period, while its reciprocal $W/N$ is a measure of the capability of the analyzer to resolve any two frequency components. For the sine wave $S(t)$ which has been discussed, $W/N$ is equal to the peak-to-null spacing of the sin $x/x$ envelope of the spectrum.

All of these parameters are readily identifiable by reference to FIGURE 5 which represents the analysis of the spectrum of the sinusoid $S(t)$ output of vogad 70 as performed by the ADV analyzer and as appearing at the output of SRSS unit 96. The quantitative values assigned in FIGURE 5 are purely illustrative and are not to be taken as placing any limitation on the possible values of the variable analyzer parameters, all of which may be preselected and readily programmed in the analyzer circuitry, as reference again to expression (13b), represented by FIGURE 5, will indicate.

It is notable that the sampled values $|u_m|$ of the spectrum obtained from the analyzer in the manner described above correspond to those which are obtained from a filter bank consisting of a plurality of filters having sin $x/x$ characteristics and spaced at $W/N$ frequency intervals. Thus, in addition to other features of the present invention which have or will become apparent in this description, the system eliminates the requirement of band-pass filters while performing the function, among others, attributable thereto in a programmable, and thus extremely versatile, operation.

As a second example of the selective control which may be exercised over filter characteristics and the spectrum analysis, consider the use of a "triangular" weighting function defined by $$w_{nm} = \{^{n}N - n + 1$$

$$n=1, 2, \ldots (N+1)/2, \; n=(N+3)/2, (N+5)/2, \ldots N \quad \text{(N assumed to be odd).} \qquad (14a)$$

Substituting this expression in (12), again assuming $M_m$ is equal to a constant M for all values of $m$, and $N'=N$, $$Um = [A(f) + jB(f)] \exp\left[j2\pi\frac{mN}{M}\right] \exp \left[j2\pi\frac{N+1}{2}\,\frac{\left(f - m\frac{W}{M}\right)}{W}\right] \cdot \frac{\sin^2 \pi\frac{\left(f - m\frac{W}{M}\right)}{2W/(N+1)}}{\sin^2\frac{2\pi}{N+1}\,\frac{\left(f - m\frac{W}{M}\right)}{2W/(N+1)}} \qquad (14b)$$

The above substitution may be functionally executed by the arithmetic unit by appropriate selection of stored values, shift register contents, and generated functions, to provide the desired parameters.

The real and imaginary parts of $u_m$ are applied to SRSS unit 96 which is operative to compute the absolute value of $u_m$, i.e.

$$|u_m| = \sqrt{A(f)^2 + B(f)^2}\,\frac{\sin^2 \pi\frac{\left(f - m\frac{W}{M}\right)}{2W/(N+1)}}{\sin^2\frac{2\pi}{N+1}\,\frac{\left(f - m\frac{W}{M}\right)}{2W/(N+1)}} \qquad (14c)$$

Comparing expression (14c) with equation (13b), it is apparent that whereas the use of a uniform weighting function resulting in a sin $x/x$ frequency characteristic, the use of a triangular weighting function results in a $\sin^2 x/x^2$ frequency characteristic. By associating different weighting functions with different slot numbers, then, the arithmetic unit is operative to provide the equivalent of a bank of filters in which the frequency characteristics of the filters are individually tailored to a particular application.

In order to impart sufficient detail to the derived amplitude spectrum of the input signal for purposes of analysis, certain basic analyzer parameters should be considered. Typically, the pitch frequency of the original speech wave ranges from 70 c.p.s. to approximately 320 c.p.s., so that for separation of harmonics a resolution of something less than 70 c.p.s., say 40 c.p.s., is required. In addition, it is desirable to measure pitch frequency with a precision of only a few percent. This objective is attained by designing the arithmetic unit for 10 c.p.s. precision (i.e., $W/M$=10 c.p.s.), for example.

On the other hand, gross spectral density characteristics of the voice signal need not be measured with the resolution and precision required of the pitch frequency measurement. It is therefore possible to minimize the total number of spectral measurements, and thereby minimize equipment complexity, by limiting the region of fine grained spectral density measurements. Such a region should include the fundamental pitch frequency $f_0$ and at least the second harmonic for the highest anticipated pitch frequency. Thus, in this example, the limited region of such measurements may readily range from 0 to 640 c.p.s. A suitable programming arrangement for the arithmetic unit, utilizing these quantitative examples, is illustrated in graphic representation in FIGURE 6.

Referring now to FIGURE 6, for a frame consisting of 128 time slots, each slot containing a *k*-bit word, the spectrum of the voice signal is preferably sampled, for reasons previously considered, during the first 64 time slots at intervals of 10 c.p.s. (in the region from 0 to 640 c.p.s., lefthand scale) with a resolution of 40 c.p.s. Each heavy dot on the graph represents a spectral density measurement. Beginning with the 65th time slot, associated with the righthand center frequency scale of the graph, and ending with the 96th time slot, the precision of the measurements is reduced by sampling the spectrum at 40 c.p.s. intervals, while maintaining a resolution of 40 c.p.s. also. From the 97th to the 122nd time slot, both precision and resolution are further reduced with spectrum samples being taken at 80 c.p.s. intervals and 80 c.p.s. resolution.

Referring again to the illustrative control unit of FIGURE 4*b*, these operations may be effected by suitably programming the operation of the arithmetic unit of FIGURE 4*a*. The control unit, in this example, permits the specification of either one of two possible resolutions, any one of four possible precisions, and either one of two possible weighting functions for each slot in a frame. As previously discussed, the resolution is given by the parameter $W/N$, so that a change in resolution may be accomplished by the equivalent of a change in N. A convenient manner of changing N is by clearing at a particular position in a slot all arithmetic unit registers used in the computational process of that unit. If, for example, the arithmetic unit registers are cleared at the Pth position of a slot the computation essentially begins with the $(P+1)$th position and proceeds through the Nth position, and the resolution is then given by $W/(N-P)$. To provide the resolution required by the spectrum analysis program shown in FIGURE 6, then, W may be selected to have a value of 5120 cycles per second and N a value of 128. With a clear signal at the end of each slot period for the first 96 slots, the resolution is $$W/N=5120/128=40 \text{ c.p.s.}$$

For the 97th through 128th slots the clear signal is programmed to occur both in the middle and at the end of each slot period so that $P=N/2=64$ and the resolution is $W/(N-P)=5120/(128-64)=80$ c.p.s.

This program is obtained by filling the first 96 elements or stages (from right to left) of resolution shift register 184 (FIGURE 4*b*) with "1's" and filling the remaining elements with "0's." The contents of register 184 are shifted to the right and recirculated at the slot rate WN by shift pulses emanating from clock 180. Thus, switch 182 remains in the "1" position for the first 96 slots of the frame and the clear signal is supplied at the end of each slot period, thereby providing a resolution of 40 c.p.s. Beginning with the 97th slot "0's" start arriving at the end of shift register 184, switch 182 assumes the "0" position and the clear signal is supplied at both the middle and the end of each slot period, thereby providing a resolution of 80 c.p.s. for the remaining (97th through 128th) slots. It will, of course, be apparent to those skilled in the art that this arrangement may be generalized to provide clear signals at any desired positions in the slots to obtain resolutions as required for a particular situation.

The precision $W/M$ associated with each particular slot is controlled by appropirate selection of any one of four possible sets of $\epsilon_{mr}$ and $\epsilon_{mi}$, obtained respectively from cosine storage 186 and sine storage 187. For the exemplary $\epsilon_m$ chosen, indicated by expression (11*b*), $$\epsilon_{mr}=\cos 2\pi/M_m$$

and $\epsilon_{mi}=\sin 2\pi/M_m$, so that values of M equal to 512, 256, 128 and 64, corresponding to precisions of 10 c.p.s. 20 c.p.s., 40 c.p.s., and 80 c.p.s., respectively, may be selected. To obtain the precision required by the illustrative spectrum analysis program of FIGURE 6, the first 64 elements (counting from the right) of each of precision shift registers 195 and 196 are filled with "1's," elements 65 through 96 of register 195 with "1's" and of register 196 with "0's," and the remaining elements (97 through 128) of each register with "0's." It will be apparent that the appropriate values of $\epsilon_{mr}$ and $\epsilon_{mi}$ are thus supplied for the arithmetic unit computation so that precisions of 10 c.p.s., 40 c.p.s., and 80 c.p.s. are associated with slots 1–64, 95–96, and 97–128, respectviely, as the contents of the two precision shift registers are shifted to the right and recirculated at the slot rate WN.

Although the previous description has not indicated a need for different weighting functions during a single spectrum analysis program, such selection for different slots may be desired in a specific situation and is conveniently provided by appropriately filling weighting function shift register 199 with "1's" and "0's" for controlling the output of function generator 197 supplied to the arithmetic unit. Operation corresponds to that described above for resolution and precision selection.

The spectrum samples of the incoming speech wave, derived at the output of SRSS unit 96, are further processed to provide spectral density characteristics, pitch frequency, and voiced/unvoiced (V/UV) criteria of the wave, by parallel application to spectral density format converter 100, pitch extractor 103, and V/UV detector 105, respectively.

The logic circuitry of spectral density format converter 100 is shown in greater detail in FIGURE 7. The function of this unit is to compress the discrete spectral density measurements appearing at the SRSS output into a smaller number of digital quanta more appropriate for transmission. Operation of converter 100 is best explained by reference to a quantitative example, and therefore, this portion of the description will include a continuation of the 128 time slot frame example begun immediately above. Referring concurrently to FIGURE 8, each of the 128 slots is associated with a spectral density measurement which is to be utilized for retention of voice signal definition and characteristics and for subsequent reconstruction of that signal, i.e., reformation of the original speech wave in the synthesizer. Purely by way of illustration, certain of the slots are designated as "active slots," each of these being denoted by the vertical lines along the "time slot" abscissa of FIGURE 8. Similarly, the group of active slots is subdivided into a plurality of subgroups designated "slot combinations," the "top slot" of each combination being indicated in the figure by the taller vertical lines along the time slot abscissa, and the slot combinations being denoted by the lines 1–8 terminating in arrowheads pointing to the particular intervals (or more precisely, active slots) from top slot of one such combination to top slot of the next. For example, slot combination, or channel, 11 is designated as including active slots 90–94 (94 being the top slot). Referring back to FIGURE 6, the center frequency for this channel, i.e., slot combination 11, thus corresponds to the frequency spectral density measurement coinciding with time slot 92, or 1760 c.p.s., with a bandwidth (between slots 90–94) of 200 c.p.s. In the typical, although non-limiting, example set forth in the chart shown in FIGURE 8, the center frequency and bandwidth of the preselected channels are indicated in tabular form below.

TABLE 1

| Channel (or Slot) Combination | Center Frequency (c.p.s.) | Bandwidth (null-to-null spacing, c.p.s.) |
|---|---|---|
| 1 | 260 | 120 |
| 2 | 400 | 120 |
| 3 | 530 | 120 |
| 4 | 660 | 160 |
| 5 | 800 | 120 |
| 6 | 920 | 120 |
| 7 | 1060 | 160 |
| 8 | 1220 | 160 |
| 9 | 1380 | 160 |
| 10 | 1560 | 200 |
| 11 | 1760 | 200 |
| 12 | 1980 | 260 |
| 13 | 2240 | 240 |
| 14 | 2480 | 240 |
| 15 | 2760 | 320 |
| 16 | 3080 | 320 |
| 17 | 3440 | 400 |
| 18 | 3800 | 400 |

In general, the mean spectral density of each channel (slot combination) is a value which is obtained by summing the spectral density values associated with each of the active slots in the combination, and dividing this sum by the number of active slots in the combination.

The derivation of mean or average value of spectral density is accomplished by the exemplary embodiment of spectral density format converter 100 shown in FIGURE 7. Referring to that figure, the spectral density samples $|\mu_m|$ from the SRSS unit are fed to normally nonconductive (i.e., closed) AND gate circuit 200 while slot synchronization pulses (i.e., pulses synchronized with the occurrence of spectral density samples at the output of SRSS unit 100) are applied in parallel to AND gate circuit 202, "active slot" recirculating shift register 205, and "top slot" recirculating shift register 207. Continuing with the previous example of 128 time slots (and thus 128 spectral density measurements from the SRSS unit), each of shift registers 205 and 207 is provided with 128 elements or stages, the locations of the preselected active slots and top slots within the 128 elements being designated by storage in the respective registers as "1's." Active slot shift register 205 is shifted at the slot rate by the incoming sync pulses, in frame synchronization with the operation of the SRSS unit, so that as the "1's" stored therein reach the end of the register a gating pulse is simultaneously applied to each of gates 200 and 202 to open the gates and permit passage therethrough of the spectral density component and slot sync pulse respectively, applied in time coincidence with the gating pulse.

Accordingly, spectral density samples associated with the preselected (i.e., pre-programmed) active slots are fed into accumulators 210 and 212, while slot sync pulses, each designating an active slot, are applied to counter 215. When a top slot "1" is shifted to the end of shift register 207, in response to application of an appropriate number of sync pulses thereto, a readout pulse is applied in parallel to accumulator 212, which has summed the values of the spectral density components passed by gate 200 since the occurrence of the last readout pulse; to counter 215, which has registered the number of slot sync pulses passed by gate 202 since the occurrence of the last readout pulse; and to divider 217, which operates to divide the contents of accumulator 212 by the contents of counter 215 as accrued during the interval between "top slots" (and, hence, the interval between readout pulses from shift register 207). In this manner, the desired mean spectral density value for each slot combination (channel) is obtained. The resultant data (i.e., the quotient from divider 217) is read into storage device 220.

Accumulator 210, however, unlike accumulator 212, is not triggered for readout at the end of each slot combination, thereby being operative instead to sum the values of all spectral density components associated with active slots over an entire frame period to provide a measure of voice amplitude parameter (VAP). At the conclusion of the frame period, this summation is read into storage device 223, and thereafter employed to normalize mean spectral density values data stored in storage device 220. To this end, the contents of storage unit 220 are read out in sequence for application to divider 225. Simultaneously with the application of each mean spectral density value to the divider, the VAP is also fed into the divider to be used as the normalization factor, i.e., the mean spectral density values are divided successively by the VAP value. Both the VAP and the normalized mean spectral density values may, if desired, be fed to code converter 230, for conversion to logarithmic scale of units and application to frame assembly unit 108 (FIGURE 2).

Pitch measurement is derived from the information (spectral density samples) appearing at the output terminal of SRSS unit 96 by the operation of pitch extractor 103 (FIGURE 2), an exemplary embodiment of which is shown in detail in FIGURE 9. Before proceeding with the detailed description of FIGURE 9, it will be recalled that fine grained spectral density measurements were previously stated to be arbitrarily limited to a region of the speech wave spectrum which would predictably include the fundamental pitch frequency $f_0$ and at least the second harmonic thereof. The purpose of this predetermined limitation is to minimize the number of spectral density measurements required and hence to minimize apparatus complexity, while retaining the necessary resolution and precision for the pitch frequency measurement. As noted above, in a typical example, the arithmetic unit is designed for $W/M=10$ c.p.s. (precision) and $W/N=40$ c.p.s. (resolution) for the first 64 time slots (assuming a total of 128 time slots), covering a region of the frequency spectrum from 0 to 1640 c.p.s. (see FIGURE 6). This region is determined using the assumption that $f_0$ will range from 70 c.p.s. to 320 c.p.s., approximately, and that the selected region will therefore include the second harmonic (640 c.p.s.) for the highest anticipated $f_0$.

With these considerations in mind, reference is now made to FIGURE 10, which shows in graphic form a typical set of spectral density measurement corresponding to the first 64 time slots of the program illustrated in FIGURE 6, for a fundamental pitch frequency $f_0$ of 120 c.p.s. Harmonics of this fundamental will obviously occur at 240, 360, 480 and 600 c.p.s., designated by the peaks (including the fundamental) in FIGURE 10. Each vertical line denotes a discrete spectral density sample $|u_m|$ associated with a particular time slot, as measured at the output terminal of SRSS unit 96. Circuitry for deriving a measure of $f_0$ from this data is illustrated in FIGURE 9, to which particular attention is now directed.

At the start of each frame period, all counters are cleared and switches 250 and 252 are actuated to the illustrated positions. Slot synchronization pulses are sequentially applied to slot counter 240 so that the number of the slot associated with each discrete spectral density value obtained from the SRSS unit is always available during the frame period under consideration. Each of these values, in digital format, is delayed by a time interval equal to that between consecutive values (i.e., the slot spacing) and reversed in sign by unit 244, which may include a conventional delay device and polarity inverter. The output of unit 244 is applied to summing network 246 where it is added to the undelayed value, i.e., the spectral density value immediately following the value which has been delayed and reversed. It will readily be appreciated that this operation will result in a positive output from summing network 246 if the values of the spectral density components under consideration are increasing from slot to slot, and a negative output if the values are decreasing. For example, if the value associated with slot 21 (FIGURE 10) is delayed and reversed, and added to the value associated with slot 22, which has retained its original relation to the time datum during this particular interval, then it is obvious that the result is effectively simply the difference between the height of the spectral lines, the value of the former being algebraically subtracted from the value of the latter, to provide a positive value. On the other hand, if the same operation is performed utilizing components associated with slots 26 and 27, the output of unit 246 is negative and thus indicative of a decrease in value of consecutive spectral density components. Polarity transition points therefore occur at the peaks (positive-to-negative) and nulls (negative-to-positive) of the envelope defined by the height of the vertical lines in FIGURE 10.

Detector 248 is employed to sense the positive-to-negative polarity transition points, as manifested by the pulses applied thereto from summing network 246, and to respond to the initial such transition during the frame period by generating a trigger pulse to effect a readout of the contents of slot counter 240 into storage unit 255, the trigger pulse being delayed sufficiently by delay line 249 to actuate switches 250 and 252 to their respective second positions after the transfer of slot number from counter 240 to storage unit 255 is completed.

Polarity transitions from positive-to-negative subsequent to this initial transition are registered in pitch harmonic counter 261, as a pulse is generated by detector 248 each time such a transition occurs and applied via switch 252 to counter 261. Hence, information as to the number of harmonics present within the selected region of the spectrum is made available for subsequent computational processing within the extractor. Similarly, the contents of slot counter 240 are transferred to storage unit 256 via switch 250 each time a transition indicative of the presence of a harmonic of pitch frequency is detected, but the storage unit is arranged to retain only the time slot number associated with the most recent transition.

Upon receipt of the 64th slot sync pulse by counter 240, as measured from the beginning of the frame period, the contents of storage units 255 and 256 are read into subtractor 259, the former subtracted from the latter, and the resultant data applied simultaneously with the contents of pitch harmonic counter 261 to divider 264 for division thereby. Hence, the output of the divider is representative of $f_0$, the fundamental pitch frequency. This may readily be verified by further reference to FIGURE 10. At the end of the 64th time slot, storage unit 255 contains a value representative of time slot 12 (at which the first positive-to-negative transition occurred) while storage unit 256 contains a count representing slot 60, the difference being $60-12=48$. Pitch harmonic counter 261 has registered 4 transitions subsequent to the initial transition, so that the output of divider 264 is $48/4=12$, which, at the 10 c.p.s. slot separation, is indicative of a fundamental pitch frequency ($f_0$) of 120 c.p.s. A multiplying factor of 10 (or other desired separation) may appropriately be included in the computational process performed by the pitch extractor, if desired, although this is not necessary. In addition, the output taken from divider 264, may, if desired, be applied to a code converter 267 for conversion to logarithmic scale prior to application to the frame assembly unit.

It will be noted that the greater the number of harmonics included in the region of the spectrum selected (in terms of spectral density components or measurements derived from the associated time slots), the smaller is the error in computing $f_0$ by the pitch extractor. To illustrate, assume that the location of the fundamental, as ascertained by operation of the extractor, is in error by 3 c.p.s., i.e., appears to be 120 c.p.s. when it is actually 123 c.p.s. The second harmonic would be 246 c.p.s. which would be measured as 250 c.p.s. Assume that only the first and second harmonics are included in the calculation of pitch. The operation of the extractor, viz.: $(250-120)/1=130$ c.p.s., produces an error of approximately 5.4 percent. When the first four harmonics are considered under similar circumstances, however, the error is $$(620-120)/4=125$$

c.p.s., only about 1.6 percent. Thus, selection of a region for fine spectral density measurements including at least the first harmonic of the highest anticipated fundamental pitch frequency results in an excellent compromise between system complexity and accuracy of computed fundamental pitch frequency, since in general a number of harmonics will be included in the computational process.

The V/UV detector 105 is shown in detail in FIGURE 11. Typically, channel vocoders of the conventional type distinguish voiced and unvoiced sounds by utilizing a low-pass, high-pass scheme from which a determination of the periodicity or aperiodicity, respectively, of the wave form is made. Derivation of fundamental pitch frequency $f_0$ is, of course, effected only for the voiced sounds. A similar scheme of voiced/unvoiced detection, utilizing a digital format may be employed in the V/UV detector in accordance with the present invention.

At the beginning of a frame period all elements of detector 105 are cleared, and switch 277 is actuated to feed spectral density values ($|u_m|$) to accumulator 279. These values are summed in accumulator 279 while slot pulses synchronized therewith are applied to slot counter 275, until the slot number representative of the line of demarcation of the low-pass, high-pass scheme as customarily employed in prior art V/UV detectors is reached. At that point, the particular slot number, of course, having been pre-programmed, counter 275 generates a trigger pulse to actuate switch 277 to its second position, thus applying the remaining spectral density values for the frame period under consideration to accumulator 280. While reference is made to the various switches described and illustrated herein, such as switch 277, as having a plurality of "positions" and as being of a mechanical nature, it will be appreciated that electronic switch or gate circuits may be employed and are preferable for the pulsed high speed operation.

The contents of accumulator 279 are normalized by a desired reference value by application of the summed value and the normalizing factor to a multiplier 284, concurrently with the summation of the remaining spectral density values in accumulator 280. At the end of the frame, the normalized contents of accumulator 279 and the contents of accumulator 280, having been fed into subtractor 286, are subtracted from each other, i.e., the former from the latter, at the command of a frame sync pulse applied to the subtractor. The sign of the difference, represented by an output generated by the subtractor and indicative of whether the input sound is voiced or unvoiced in the conventional manner of the low-pass, high-pass technique, is applied to the frame assembly unit 108.

Referring now to FIGURE 12, frame assembly unit 108 comprises a plurality of buffer storage devices 290–293 associated respectively with a similar plurality of serially coupled shift registers 296–299, the latter being arranged to shift out their contents in sequence to the modulator portion of any conventional and suitable modem (modulator-demodulator) system for transmission via the desired communications link to the synthesizer in response to shift pulses applied thereto at the conclusion of the frame period.

The mean spectral density values and VAP from spectral density format converter 100 are serially applied to respective buffer storage devices 290 and 291, while the outputs obtained from pitch extractor 103 and V/UV detector 105 are applied to their respective buffer storage devices 292 and 293. The conclusion of a frame period is signified by transfer pulses applied in parallel to the several buffer storage devices to effect a transfer of the contents of each storage device to its associated shift register. Application of shift pulses to the registers is then effective to cause the shifting out of the digital data therefrom in sequential fashion to the modem.

*ADV synthesizer*

The transmitted digital data is received by the demodulator portion of the conventional modem system and thence applied to the ADV synthesizer shown in simplified block diagrammatic form in FIGURE 13. The object of the synthesizer, of course, is to reconstruct the original speech wave using the data received from the analyzer section. To this end, the incoming data is applied to frame disassembly unit 300 where the spectral density data, the pitch data and the voiced/unvoiced data are forwarded respectively to the spectral density format converter 303, buzz spectrum generator 308, and V/UV storage unit 310. A simple and convenient illustrative embodiment of the disassembly unit is a circuit comprising three gates fed in parallel by the incoming data and appropriately timed to pass the proper data.

The spectral density data is converted into an appropriate format for processing by converter 303 and the format applied in parallel to multipliers 327 and 330, where the data is multiplied by the output of either the buzz spectrum generator 308 or the hiss spectrum generator 305, depending respectively upon whether the sound to be synthesized is to be voiced or unvoiced. To this end, the hiss or buzz outputs are selectively applied to the multipliers 327, 330, by appropriate actuation of switches 315, 317, 320 and 322 under the control of appropriate signal applied to the switches by V/UV storage unit 310. The outputs of the two multipliers are then fed to arithmetic unit 335 for further processing.

It is advantageous at this point to discuss the operation of arithmetic unit 335 and the succeeding processing devices prior to the detailed description of the spectral density format converter 303, hiss spectrum generator 305, and buzz spectrum generator 308 in order to provide a better understanding of the operation of the latter three units.

A suitable form for arithmetic unit 335 is shown by the block diagrammatic representation in FIGURE 14*a*, with concurrent reference being had to FIGURE 14*b* during the description of operation of the unit. FIGURE 14*a* illustrates apparatus for processing the applied word sequences in complex-word form. FIGURE 15, to be described presently, shows apparatus for performing a completely equivalent process with real-word inputs. Assume first that the inputs to the arithmetic unit are the complex word sequence $u_n$ having real and imaginary parts $u_{nr}$ and $u_{ni}$ respectively and complex word sequence $\epsilon_n$ having real and imaginary parts $\epsilon_{nr}$ and $\epsilon_{ni}$ respectively, $\epsilon_n$ being assumed, for example, to be a constant $\epsilon=\exp(-j2\pi/M)$ having an absolute value equal to 1. The manner in which these complex word sequences are derived will be clearly understood upon subsequent reference to the operation of spectral density format converter 303, hiss spectrum generator 305 and buzz spectrum generator 308 which are to be described presently. It will be noted that the arithmetic unit arrangements shown in FIGURES 14*a* and 15 are quite similar to the arrangement of apparatus shown in FIGURES 3*a* and 4, respectively, of the analyzer section. The input words $u_1$, $u_2$, $u^3$, . . . $u_N$, which were read into memory 364 during the preceding frame period, are read out repetitively in sequence during the current frame period at a rate N′ times the input rate (again assuming, for simplicity, that $N'=N$) in a manner similar to that described with reference to the memory unit 122 of the analyzer section. The memory output is indicated in the chart of FIGURE 14*b*. During the first time slot, the output of memory 364 is added to the output of multiplier 372 (equal to zero at the beginning of each slot period) by adder 367, the adder output is delayed by one position by delay unit 370, multiplied in unit 372 by the complex number $\epsilon$ obtained from storage unit 378, and added to the memory output, whereupon the process is repeated.

At the end of the first slot period, the contents of the adder (denoted by $U_1$) is $$U_1=u_1\epsilon^{N-1}+u_2\epsilon^{N-2}+u_3\epsilon^{N-3}+ \ldots +u_N \quad (15)$$

Normally gate 375 is closed so that the products circulating through the loop including delay line 370, are not passed to multiplier 377. At the end of the slot period, a slot sync pulse is applied to the gate 375 to permit the contents of the adder $U_1$ to be applied to multiplier 377. The second input to the multiplier is $(-1)^m$ and since $m=1$ in the case of the first slot, $U_1$ is multiplied by $-1$ to effect a change in sign thereof at the output of multiplier.

Simultaneously with the passage of the contents of adder 367 through gate 375 all the elements of the loop are cleared and a new computation is begun. The second computation proceeds in similar fashion except that in this case the input $\epsilon^m$ to multiplier 372 becomes $\epsilon^2$. Again, the various powers of $\epsilon_n$ that are required during the sequence of computations may easily be derived by reserving a portion of time during each slot period for computing and obtaining the power of $\epsilon_n$ necessary for the next computation utilizing the storage 378, switches 373 and 374, and another storage unit (not shown) from which the function $\epsilon_n$ is obtained. This operation corresponds to that described above for the arithmetic unit of the analyzer.

At the end of the second slot period, the contents of the adder $U_2$ is $$U_2=u_1\epsilon^{2(N-1)}+u_2\epsilon^{2(N-2)}+u_3\epsilon^{2(N-3)}+ \ldots +u_N \quad (16)$$

which is passed through gate 375 and multiplier 377 without sign change, since this slot is an even numbered one. In general, then, the contents of the adder at the end of the $m$'th slot period is $$U_m=\sum_{n=1}^{N} u_n\epsilon^{m(N-n)}=\sum_{n=1}^{N} u_n \exp\left[-j2\pi\frac{m(N-n)}{M}\right] \quad (17)$$

and the output of arithmetic unit 335 at the end of the $m$'th slot, $\underline{U}_m$, becomes $$\underline{U}_m=(-1)^m U_m=\exp\left[j2\pi\frac{m(M/2)}{M}\right] U_m \quad (18)$$

or, substituting (17) into (18)

$$\underline{U}_m=\sum_{n=1}^{N} u_n \exp\left[-j2\pi\frac{m(-M/2+N-n)}{M}\right] \quad (19)$$

Output signals $\underline{U}_m$ are complex numbers having real and imaginary parts $\underline{U}_{mr}$ and $\underline{U}_{mi}$. In a practical embodiment of arithmetic unit 335 for separately processing the real and imaginary parts $u_{nr}$ and $u_{ni}$ of the complex input words previously described, shown in FIGURE 15, $u_{nr}$ is applied to memory unit 380 where it is stored and read out at N′ (N′ assumed equal to N) times the input rate for sequential application to summing unit 382. The process is the same as that explained with respect to the complex number process performed by the apparatus of FIGURE 14*a*, except that each processing channel includes a pair of multipliers, for example, 386 and 388 in the $u_{nr}$ processing channel, and a combining unit, for example substractor 390 in the $u_{nr}$ processing channel, to provide the second input to summing unit 382. The output signal product derived by multiplier 386 is obtained from the output of delay unit 384 and an input $\epsilon_{nr}^m$ and the output signal product from the multiplier 388 obtained from the output of delay line 404 in the $u_{ni}$ processing channel and a second input $\epsilon_{ni}^m$. This corresponds exactly to the apparatus and operation discussed in connection with FIGURE 4*a*. At the end of the slot period the contents of summing unit 382 are passed by gate 393 to multiplier 395 and simultaneously the contents of adder 402 passed by gate 413 to multiplier 415 to provide the appropriate sign for the output word sequences $\underline{U}_{mr}$ and $\underline{U}_{mi}$, where $$\underline{U}_{mr}=\sum_{n=1}^{N}\left[u_{nr}\cos 2\pi\frac{m(-M/2+N-n)}{M}+u_{ni}\sin 2\pi\frac{m(-M/2+N-n)}{M}\right] \quad (20)$$

$$\underline{U}_{mi}=\sum_{n=1}^{N}\left[-u_{nr}\sin 2\pi\frac{m(-M/2+N-n)}{M}+u_{ni}\cos 2\pi\frac{m(-M/2+N-n)}{M}\right]$$

These word streams or sequences from the arithmetic unit 335 are applied respectively to conventional digital to analog converters 340 and 342 (FIGURE 13) where each digital word is converted to an analog voltage, and the analog voltages appearing at the outputs of the digital to analog converters applied respectively to low pass filters 345 and 347, each having a bandwidth $W/2$ c.p.s., to provide the desired waveforms. The outputs $U_r(t)$ and $U_i(t)$ of filters 345 and 347, respectively, are $$U_r(t)=\sum_{n=1}^{N}\left[u_{nr}\cos 2\pi(-M/2+N-n)\frac{W}{M}t+u_{ni}\sin 2\pi(-M/2+N-n)\frac{W}{M}t\right] \quad (21)$$

$$U_i(t)=\sum_{n=1}^{N}\left[-u_{nr}\sin 2\pi(-M/2+N-n)\frac{W}{M}t+u_{ni}\cos 2\pi(-M/2+N-n)\frac{W}{M}t\right]$$

Each of signals $U_r(t)$ and $U_i(t)$ from the low pass filters 345 and 347, respectively, are applied to balanced modulators 350 and 352 for construction of the original input signal. To this end, each of the input signals is multiplied in the balanced modulator to which it is applied by a sine or cosine function, respectively, to produce an output signal $S(t)$ at the junction of the output terminals of the modulators, where $$S(t)=\sum_{n=1}^{N}\left[u_{nr}\sin 2\pi(N-n)\frac{W}{M}t-u_{ni}\cos 2\pi(N-n)\frac{W}{M}t\right] \quad (22)$$

Reconstructed signal $S(t)$, which is now in a form suitable for application to a loudspeaker or other appropriate electroacoustic transducer, consists of a summation of sine and cosine functions having frequency separations of $W/M$ from zero to $(N-1)W/M$, and amplitudes respectively governed by the input word sequences $u_{nr}$ and $u_{ni}$. In general, the amplitudes of the components of frequency $mW/M$ are determined by the contents of the $(N-m)$th slot. For example, for a 12 slot frame, i.e., $N=12$, the amplitude of the DC component is determined by the contents of the 12th slot and the amplitudes of the components of frequency $W/M$ are determined by the contents of the 11th slot.

It is necessary in the speech synthesizing process to substitute the number 1 (i.e., $1+j0$) for $\epsilon$ in certain positions of each time slot (see FIGURE 14*b*). The effect of one such substitution is shown, purely by way of example, in Table 2, assuming $N=12$.

TABLE 2

| SLOT (m) | | | | | 1 | | | | | | | |
|---|---|---|---|---|---|---|---|---|---|---|---|---|
| POSITION (n) | 1 | 2 | 3 | 4 | 5 | 6 | 7 | 8 | 9 | 10 | 11 | 12 |
| $\epsilon_n^m$ | $\epsilon$ | $\epsilon$ | $\epsilon$ | $\epsilon$ | 1 | $\epsilon$ | $\epsilon$ | $\epsilon$ | $\epsilon$ | $\epsilon$ | $\epsilon$ | $\epsilon$ |
| MEMORY OUTPUT | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ |
| CIRCULATED ONCE | | $u_1\epsilon$ | $u_2\epsilon$ | $u_3\epsilon$ | $u_4$ | $u_5\epsilon$ | $u_6\epsilon$ | $u_7\epsilon$ | $u_8\epsilon$ | $u_9\epsilon$ | $u_{10}\epsilon$ | $u_{11}\epsilon$ |
| CIRCULATED TWICE | | | $u_1\epsilon^2$ | $u_2\epsilon^2$ | $u_3\epsilon$ | $u_4\epsilon$ | $u_5\epsilon^2$ | $u_6\epsilon^2$ | $u_7\epsilon^2$ | $u_8\epsilon^2$ | $u_9\epsilon^2$ | $u_{10}\epsilon^2$ |
| CIRCULATED 3 TIMES | | | | $u_1\epsilon^3$ | $u_2\epsilon^2$ | $u_3\epsilon^2$ | $u_4\epsilon^3$ | $u_5\epsilon^3$ | $u_6\epsilon^3$ | $u_7\epsilon^3$ | $u_8\epsilon^3$ | $u_9\epsilon^3$ |
| CIRCULATED 4 TIMES | | | | | $u_1\epsilon^3$ | $u_2\epsilon^3$ | $u_3\epsilon^3$ | $u_4\epsilon^3$ | $u_5\epsilon^4$ | $u_6\epsilon^4$ | $u_7\epsilon^4$ | $u_8\epsilon^4$ |
| CIRCULATED 5 TIMES | | | | | | $u_1\epsilon^4$ | $u_2\epsilon^4$ | $u_3\epsilon^4$ | $u_4\epsilon^4$ | $u_5\epsilon^5$ | $u_6\epsilon^5$ | $u_7\epsilon^5$ |
| CIRCULATED 6 TIMES | | | | | | | $u_1\epsilon^5$ | $u_2\epsilon^5$ | $u_3\epsilon^5$ | $u_4\epsilon^5$ | $u_5\epsilon^6$ | $u_6\epsilon^6$ |
| CIRCULATED 7 TIMES | | | | | | | | $u_1\epsilon^6$ | $u_2\epsilon^6$ | $u_3\epsilon^6$ | $u_4\epsilon^6$ | $u_5\epsilon^7$ |
| CIRCULATED 8 TIMES | | | | | | | | | $u_1\epsilon^7$ | $u_2\epsilon^7$ | $u_3\epsilon^7$ | $u_4\epsilon^7$ |
| CIRCULATED 9 TIMES | | | | | | | | | | $u_1\epsilon^8$ | $u_2\epsilon^8$ | $u_3\epsilon^8$ |
| CIRCULATED 10 TIMES | | | | | | | | | | | $u_1\epsilon^9$ | $u_2\epsilon^9$ |
| CIRCULATED 11 TIMES | | | | | | | | | | | | $u_1\epsilon^{10}$ |

Examination of the last position (12, in this case) will reveal that a 1 substituted for $\epsilon$ in the 5th position reduces the powers of $\epsilon$ by 1 in the terms containing $u_1$, $u_2$, $u_3$ and $u_4$, while it has no effect on the terms containing $u_5$, $u_6$, . . . , $u_{12}$.

In general, it may be stated that a 1 substituted for $\epsilon$ in the $k$th position reduces the power of $\epsilon$ by 1 in the terms containing $u_1$, $u_2$, . . . , $u_{k-1}$, and has no effect on the terms containing $u_k$, $u_{k+1}$, . . . , $u_N$. This result may be expressed mathematically as follows:

$$U_m=\sum_{n=1}^{k-1}u_n\epsilon^{m(N-n-1)}+\sum_{n=k}^{N}u_n\epsilon^{m(N-n)} \quad (23)$$

Carrying this expression through the subsequent processing steps gives $$S(t)=\sum_{n=1}^{k-1}\left[u_{nr}\sin 2\pi(N-n-1)\frac{W}{M}t-u_{ni}\cos 2\pi(N-n-1)\frac{W}{M}t\right]+\sum_{n=k}^{N}\left[u_{nr}\sin 2\pi(N-n)\frac{W}{M}t-u_{ni}\cos 2\pi(N-n)\frac{W}{M}t\right] \quad (24)$$

Expression (24) shows that substitution of 1 for $\epsilon$ in the $k$th position reduces the frequencies associates with $u_1$, $u_2$, . . . , $u_{k-1}$, by one increment, $W/M$. The frequencies associated with $u_k$, $u_{k+1}$, . . . , $u_N$, remain the same.

The substitution of more than a single 1 for $\epsilon$ has a cumulative effect in that the total shift in the frequencies associated with any one slot is equal to the sum of the 1 substitutions in all higher numbered positions. An example of this substitution is shown in Table 3.

operation of spectral density format converter 303, hiss spectrum generator 305 and buzz spectrum generator 308, it is well known that an unvoiced sound is essentially band-limited noise, the spectrum of which has been modified by the resonances of the vocal cavity. The band-limited noise, $N(t)$ can be represented by the Fourier series $$N(t)=\sum_{n=0}^{N-1}\left[h_{nr}\sin 2\pi n\frac{W}{M}t-h_{ni}\cos 2\pi n\frac{W}{N}t\right] \quad (25)$$

where $h_{nr}$ and $h_{ni}$ are independent, normally distributed, random variables and the frequencies of the sine and cosine components are harmonics of the frame rate $W/N$.

The spectrum of the band-limited noise function is modified in passing through the vocal cavity so that unvoiced sound $S_u(t)$ may be expressed as $$S_u(t)=\sum_{n=1}^{N-1}s_nh_{nr}\sin 2\pi n\frac{W}{M}t-s_nh_{ni}\cos 2\pi n\frac{W}{N}t \quad (26)$$

in which the amplitudes $h_{nr}$ and $h_{ni}$ of the noise components have been multiplied by the quantities $s_n$, the measured spectral density of the voice signal. Referring again to expression (22) denoting $S(t)$, it will be readily noted that the synthesis of an unvoiced sound requires that the inputs to arithmetic unit 335, $u_{(N-n)r}$ and $u_{(N-n)i}$ be equal to $s_nh_{nr}$ and $s_nh_{ni}$, respectively, thus involving a frame inversion. Such inversion may readily be accomplished in arithmetic unit 335 by reading frames out of memory unit 364 (FIGURE 14*a*) in reverse order. The expression for the unvoiced sound, $S_u(t)$, when compared to the reconstructed signal $S(t)$, further requires that $W/M$ be equal to $W/N$. Spectral density format converter

TABLE 3

| $\epsilon_n$ | | $\epsilon$ | 1 | $\epsilon$ | 1 | 1 | 1 | $\epsilon$ | 1 | 1 | $\epsilon$ | $\epsilon$ | $\epsilon$ |
|---|---|---|---|---|---|---|---|---|---|---|---|---|---|
| POSITION OR SLOT (n) | | 1 | 2 | 3 | 4 | 5 | 6 | 7 | 8 | 9 | 10 | 11 | 12 |
| SIN AMPLITUDE | $u_{nr}$ | $u_{1r}$ | $u_{2r}$ | $u_{3r}$ | $u_{4r}$ | $u_{5r}$ | $u_{6r}$ | $u_{7r}$ | $u_{8r}$ | $u_{9r}$ | $u_{10r}$ | $u_{11r}$ | $u_{12r}$ |
| COS AMPLITUDE | $u_{ni}$ | $u_{1i}$ | $u_{2i}$ | $u_{3i}$ | $u_{4i}$ | $u_{5i}$ | $u_{6i}$ | $u_{7i}$ | $u_{8i}$ | $u_{9i}$ | $u_{10i}$ | $u_{11i}$ | $u_{12i}$ |
| FREQUENCY | 0 | | | | | | | | | | | | ● |
| | W/M | | | | | | | | | | | ● | |
| | 2 W/M | | | | | | | | | | ● | | |
| | 3 W/M | | | | | | | ● | ● | ● | | | |
| | 4 W/M | | | ● | ● | ● | ● | | ○ | | | | |
| | 5 W/M | ● | ● | | | | | ○ | | | | | |
| | 6 W/M | | | | | | ○ | | | | | | |
| | 7 W/M | | | | | ○ | | | | | | | |
| | 8 W/M | | | | ○ | | | | | | | | |
| | 9 W/M | | | ○ | | | | | | | | | |
| | 10 W/M | | ○ | | | | | | | | | | |
| | 11 W/M | ○ | | | | | | | | | | | |

In the table, the circles correspond to the situation wherein no substitution of 1 for $\epsilon$ is made, while the dots indicate the results of substituting 1 for $\epsilon$ in accordance with the program of the row marked "$\epsilon_n$." The shift associated with the first slot is six increments, which is equal to the total number of substituted 1's in all positions of higher number than the first. Similarly, the shift associated with the second slot is five increments, and so forth, the relationship of shift corresponding to total number of 1's in higher positions holding throughout the frame.

Returning now to a discussion of the structure and

303 is therefore employed to produce the sequence $s_n$ by conversion of the spectral density data of the transmission format generated by the frame disassembly unit 300 to a computational format in which the first slot is associated with zero frequency, the second slot with a frequency $W/N$, and the $n$'th slot with a frequency of $(n-1)W/N$. The two normally distributed random variables $h_{nr}$ and $h_{ni}$ required for the unvoiced sound $S_u(t)$, are generated by hiss spectrum generator 305.

Referring now to FIGURES 16 and 17, the former being helpful in explaining the conversion of the spectral density format derived by frame disassembly unit 300 to a computational format by converter 303, and the latter showing an exemplary embodiment of the converter in block diagrammatic form, and continuing with the example previously used in describing the analyzer section of the vocoder, the desired computational format consists of a 128 slot frame, and the conversion procedure (FIGURE 16) is simply the inverse of the process performed by converter 100 in the analyzer section, with one important difference. That is, the frequencies associated with particular slot numbers are arranged to differ in the analyzer and the synthesizer. In the analyzer, the first 64 slots were associated with frequencies spaced 10 c.p.s. apart, the next 32 slots associated with frequencies separated by 40 c.p.s., and the remaining slots associated with frequencies spaced 80 c.p.s. apart. In the synthesizer, however, all slots are associated with frequencies spaced 40 c.p.s. apart; in this example, the first slot being associated with zero frequency. The spectral densities associated with the particular slot combinations are identical in the two cases. Again, it is to be emphasized that there are many possible configurations which could be selected and that the particular configuration illustrated by FIGURE 16 is to be taken strictly as an example.

One embodiment of a suitable spectral density format converter (303) for the synthesizer is shown in FIGURE 17. The active slots, represented by all vertical lines associated with the abscissa denoted time slot in FIGURE 16, and the top slots represented by the taller of those vertical lines, are stored as "1's" in the two 128-element shift registers 431 and 433. The mean spectral density data and voice amplitude parameter (VAP) received from the frame disassembly unit are first converted to a linear amplitude scale in logarithmic-linear code converter 420, if in the analyzer section the conversion to a logarithmic scale had been effected. The voice amplitude parameter is stored in VAP storage unit 423 where it is used as a multiplying factor for the linear amplitude mean spectral density data in multiplier 425. The output signals deriving from multiplier 425 are applied to eighteen-word shift register 428 for storage.

The contents of active slot recirculating shift register 433 and top slot recirculating shift register 431 are shifted from left to right, in synchronism and at the slot rate, by the parallel application of slot sync pulses thereto. At the beginning of the frame period, then, the end position of the 18-word shift register 437 contains the spectral density word associated with the first slot combination, all eighteen words stored in shift register 428 having been transferred to shift register 437 upon application of a frame sync pulse to the former at the end of the previous frame period. Thus, the spectral density word associated with the first slot combination is transferred to multipliers 327 and 330 (FIGURE 13) each time a "1," indicating an active slot, reaches the end of the active slot shift register 433. For this purpose, transfer pulses emanating from active slot shift register 433 are applied only to the word occupying the end position in shift register 437. A shift pulse is applied to register 437 in response to a "1" being shifted out of top-slot shift register 431 by the application of an appropriate number of slot sync pulses in the input thereof. Thus, upon application of the first shift pulse to shift register 437, the contents thereof are shifted to the right so that the spectral density word associated with the second slot combination now occupies the end position of register 437. Transfer of this word to multipliers 327 and 330 is effected upon application of the next transfer pulse from active slot shift register 433. This process continues until the entire 128-slot frame has been filled.

Referring now to FIGURE 18, there is shown in block diagrammatic form one embodiment of a suitable hiss spectrum generator 305, whose function, as previously stated, is to generate the random variables $h_{nr}$ and $h_{ni}$. This function is accomplished in a simple and efficient manner based on a one-dimensional random walk. At the beginning of each slot period forward-backward counters 445 and 447, of any conventional type, are cleared for application thereto of pulse sequences from pseudo-random sequence generators 440 and 442, respectively. The latter two generators are driven by clock pulses at a rate much higher than the slot rate, while the forward-backward counters are driven by the pseudo-random sequence generators.

A pseudo-random sequence is one whose statistical properties approximate those of a completely random sequence. Maximum length sequences, as shown for example in Peterson, Error Correcting Codes (Wiley, 1961), 147, 148, have the desired pseudo-random characteristics. FIGURES 7.15 and 7.17 of Peterson give examples of shift register generators which may be employed to generate such sequences.

The two independent pseudo-random pulse sequences generated by generators 440 and 442 are applied to counters 445 and 447 respectively, the latter being implemented so that a "1" increases the count therein by one while a "0" decreases the count by one. In this manner, the contents of the two counters, applied to multipliers 327 and 330 at the end of each slot period in response to application of slot sync pulses to the counters, constitute close approximations of the normally distributed random variables $h_{nr}$ and $h_{ni}$ which are required for the desired speech synthesis. Outputs are taken from the appropriate terminals of hiss spectrum generator 305 when switches 315, 317, 320 and 322 are in the positions shown in FIGURE 13 under the control of an appropriate signal designating the detection of an unvoiced sound in V/UV storage unit 310.

As previously mentioned, for an unvoiced sound $W/M$ must equal $W/N$ to provide the proper speech synthesis, which is accomplished by assigning values to $\epsilon_{nr}$ and $\epsilon_{ni}$ of cos $2\pi N$ and sin $2\pi N$, respectively, where N may be 128, these being stored in storage units 450 and 453. Thus, the desired values are also applied to arithmetic unit 335 in response to slot sync pulses applied to the appropriate storage units at the end of each slot period, provided that an unvoiced sound-representing signal from V/UV storage unit 310 has actuated the switches to a position coupling hiss spectrum generator outputs to the appropriate units.

A voiced sound $S_v(t)$ may be represented as a pulse train, the spectrum of which has been modified by the resonances of the vocal cavity. The Fourier series representation of $S_v(t)$ is expressed as $$S_v(t)=\sum_{n=0}^{N-1} s_n b_{ni} \cos 2\pi n f_0 t \tag{27}$$

where $b_{ni}$ is the amplitude of the $n$'th component of the Fourier series, and $s_n b_{ni}$ is the amplitude of the $n$'th component after transmission through the vocal cavity. As previously discussed, the appropriate sequence $s_n$ (spectral density data) is supplied by converter 303, while $f_0$, denoting fundamental pitch frequency, is a part of the information communicated to the synthesizer by the analyzer. Referring again to the expressions for $S_v(t)$ and $S(t)$, (27) and (22) respectively, it will readily be appreciated that the synthesis of a voice sound requires that inputs $u_{(N-n)r}$ and $u_{(N-n)i}$ to arithmetic unit 335 be equal to 0 and $s_n b_{ni}$, respectively. Similarly, it is required that $W/M$ be equal to pitch frequency $f_0$. At first glance, it may appear that buzz spectrum generator 308 need only supply stored values of $\epsilon_{nr}$ and $\epsilon_{ni}$ such that $$\epsilon_{nr}=\cos \frac{2\pi}{W/f_0} \tag{28}$$

$$\epsilon_{ni}=\sin \frac{2\pi}{W/f_0}$$

However, if these values were used throughout the computational frame in arithmetic unit 335, the 128th slot would control the zero frequency component; the 127th slot, the components of frequency $f_0$; the 126th slot, the components of frequency $2f_0$; and the $(N-n)$th slot, the components of frequency $nf_0$. Such a relationship between slot number and frequency is illustrated in FIGURE 19 by the line of dots labeled A, assuming a pitch frequency of 12 c.p.s. However, the spectral density values $s_n$, after frame inversion, are produced in the format represented by the solid line in FIGURE 19, in which the 128th slot controls the zero frequency component; the 127th slot, the 40 c.p.s. component; the 126th slot, the 80 c.p.s. component; and the (N−$n$)th slot, the 40$n$ c.p.s. component. It will be apparent therefore that the frequency synthesis process fails to track the spectral density data when utilizing the values of $\epsilon_{ni}$ indicated by expression (28).

In order to provide proper tracking, it becomes necessary to substitute 1's for $\epsilon_{nr}$ and 0's for $\epsilon_{ni}$ (i.e. $\epsilon_n=1+j0$) at appropriate positions in the computational frame. In this manner, it is possible to achieve a relationship between slot number and frequnecy as indicated by the dot format designated B in FIGURE 19. It will be noted that in that exemplary illustration each frequency is controlled by three slots, and only the slot on or closest to the solid line of FIGURE 19, describing the spectral density values $s_n$ after frame inversion, are used in this instance. The approach used for determination of the appropriate positions in which to substitute 1 (actually $1+j0$) for $\epsilon_n$ is indicated by Table 4.

pitch word from frame disassembly unit 300, is converted from logarithmic to linear frequency scale by log-lin (logarithmic-linear) converter 470, and stored in pitch storage unit 472. In addition, the output of converter 470 is applied to multiplier 474 where the pitch word on a linear frequency scale is multiplied by $2\pi/W$ to provide an output from the multiplier of $2\pi f_0/W$, which is the value for $2\pi/M$ required in the computation of $\epsilon_{nr}$ and $\epsilon_{ni}$. The necessary cosine and sine computations whose results are to be supplied to arithmetic unit 335, i.e., $\epsilon_{nr}=\cos 2\pi/M$, $\epsilon_{ni}=\sin 2\pi/M$ (FIGURE 15), are provided by computers 478 and 479, respectively, for example using the first two terms of the power series expansion in each case, after which the results are stored in cosine and sine storage units 482 and 483.

Pulses indicative of the pitch frequency $f_0$ and the frame rate are read out of their respective storage units 472 and 486 into accumulators 490 and 489 upon application of the first slot sync pulse of the next frame period. The contents of accumulator 490 and the contents of accumulator 489 are differenced, and if the sign of the difference is positive (or if the difference is zero) in subtractor 492, all switches in generator 308, viz. switches 494, 495, 496 and 497, are actuated to their positive positions. The spectral density word $s_0$ is applied to multiplier 327 where it

TABLE 4

| POSITION (n) | 128 | 127 | 126 | 125 | 124 | 123 | 122 | 121 | 120 | 119 | 118 | 117 |
|---|---|---|---|---|---|---|---|---|---|---|---|---|
| SPECTRAL DENSITY FORMAT ① | 0 | 40 | 80 | 120 | 160 | 200 | 240 | 280 | 320 | 360 | 400 | 440 |
| FREQUENCY SYNTHESIS FORMAT ② | 0 | 120 | 120 | 120 | 240 | 240 | 240 | 360 | 360 | 360 | 400 | 480 |
| SIGN OF ①−② | + | − | − | + | − | − | + | − | − | + | − | − |
| $\epsilon_n$ | $\epsilon$ | 1 | 1 | $\epsilon$ | 1 | 1 | $\epsilon$ | 1 | 1 | $\epsilon$ | 1 | 1 |
| $b_{N-n}$ | $b_{0i}$ | 0 | 0 | $b_{3i}$ | 0 | 0 | $b_{6i}$ | 0 | 0 | $b_{9i}$ | 0 | 0 |

The slot positions in Table 4 are listed in descending order, only those positions from 128 through 117, inclusive, being shown, although it will be realized that the listing may be carried out for all slot positions in the exemplary 128 slot position frame. The first row beneath position ($n$) illustrates the actual association of frequency with position numbers in the spectral density format. It is desired to convert the row labeled spectral density format to correspond with frequency association with slot number indicated by the row labeled frequency synthesis format. Mathematically, the proper choice of positions for substitution of 1's for $\epsilon$ during the computational cycle may readily be determined by subtracting the frequency listed in the frequency synthesis format from the frequency listed in the spectral density format for each of the several slot positions, and recording the sign or polarity of difference. If the difference is 0 the sign of the difference is selected to be positive. If $\epsilon_n$ is set equal to 1 in all slot positions in which a minus sign occurs, e.g., 127, 126, 124, 123, etc., the frequency synthesis process will proceed in the desired manner as the proper myltiplying factors are applied to multiplier 372 (FIGURE 14*a*; or multipliers 386, 388, 406, and 408 in FIGURE 15).

As indicated by FIGURE 19 it is desirable to employ only those slot numbers for which the spectral density format coincides with the frequency synthesis format in Table 4 and this is accomplished by setting $b_{(N-n)i}=0$ in all positions associated with minus signs in the table.

The desired substitution of 1 for $\epsilon_n$ (i.e., 1 for $\epsilon_{nr}$ and 0 for $\epsilon_{ni}$, since $\epsilon_n=1+j0$) and the provision of appropriate terms $b_{ni}$ is implemented by the buzz spectrum generator embodiment shown in FIGURE 20. Referring to FIGURE 20, the fundamental pitch frequency $f_0$, in the form of a is multiplied by 0 and to multiplier 330 where it is multiplied by $b_{0i}$, and the products applied to arithmetic unit 335. At the same time, the values cos $2\pi f_0/W$ and sin $2\pi f_0/W$ are supplied to the $\epsilon_{nr}$ and $\epsilon_{ni}$ inputs of arithmetic unit 335.

If the sign of the difference between the contents of accumulators 489 and 490, as evaluated by subtractor 492, is negative, the switches are retained in the negative position (or actuated to the negative position if previously in the positive position) so that spectral density word $s_n$ is multiplied by 0 in both multipliers 327 and 330, and outputs "1" and "0" supplied respectively from storage devices 504 and 505 to the $\epsilon_{nr}$ and $\epsilon_{ni}$ inputs of arithmetic unit 335. The next slot sync pulse adds the frame rate to the contents of accumulator 489, and either a "0" or the pitch frequency to the contents of accumulator 490, depending respectively on whether the sign of the difference calculated by subtractor 492 during the previous slot period was positive or negative and the operation of buzz generator 308 repeats itself. Pitch storage 472 and frame rate storage 486 are cleared at the end of each frame.

Operation of the arithmetic unit 335 and the subsequent circuitry proceeds as previously described to effect reconstruction of the original speech wave.

While I have illustrated and described one specific embodiment of my invention, it will be apparent that various changes in the specific details of construction may be effected without departing from the spirit and scope of the invention as defined by the appended claims.

I claim:

1. An adaptive digital vocoder for the coding, transmission and reconstruction of an arbitrary band-limited speech wave, comprising means for deriving a plurality of analog signals representative of amplitude, frequency and phase of the spectral components of said speech wave relative to a preselected reference signal, means for sampling said analog signals to generate streams of words therefrom, each word containing a predetermined number of sequential pulses having parameters indicative of the information conveyed by said analog signals in the time domain, Fourier transform means for deriving from said word streams a digital representation of the spectrum of said speech wave in the form of a plurality of discrete spectral density signals in the frequency domain, converter means for compressing said plurality of spectral density signals into a smaller number of signals representative of mean spectral density of said speech wave, means for detecting the presence of voiced and unvoiced sounds in said speech wave and for generating signals indicative of that presence, means for deriving pitch signals representative of the fundamental pitch frequency of the voiced sounds in said speech wave, and means for sequentially transmitting the voiced/unvoiced signals, pitch signals, and mean spectral density signals to a receiver station for reconstruction of the original speech wave therefrom.

2. A speech transmission system comprising a transmitting station for analyzing the spectrum of an incoming speech wave, said transmitting station including means for combining said speech wave with a preselected reference wave of fixed frequency greater than half the highest frequency in said speech wave, means for sampling the combined wave at intervals of the reciprocal of the frequency of said reference wave and for generating $k$-bit word sequences representative of the sampled values, means for converting said word sequences into discrete signals each indicative of a spectral density value of said speech wave, means for adjustably averaging the spectral density signals over preselected frequency intervals, means responsive to the spectral density signals for detecting and distinguishing between voiced and unvoiced sounds in said speech wave and for generating signals indicative thereof, means for extracting from the spectral density data signals indicative of voiced sounds in said speech wave, the fundamental pitch frequency thereof and for generating a signal representative of said pitch frequency, and means for assembling the averaged spectral density signals, the voiced-unvoiced sound-indicative signals, and the pitch signal in a serial transmission format; and a receiver station responsive to said transmission format for reconstructing said speech wave.

3. In a speech transmission system, the combination comprising means responsive to speech waves for developing analog signals representative of selected characteristics of said speech waves, means for sampling said analog signals at a rate equal to at least the bandwidth of said speech waves and for generating multi-bit words representative of the amplitudes of the sampled analog signals, a storage medium, means for storing said words in said storage medium in frames of data, means for sequentially obtaining from said storage medium the frames of data and for combining the data in each frame with preselected spectral control data to generate further data representative of spectral density samples of said speech waves, means for deriving from said spectral density samples pitch information indicative of fundamental pitch frequency of said speech waves, means for averaging said spectral density value samples over variable contiguous intervals of frequency and for generating data representative thereof, means for detecting from said spectral density samples information indicative of voiced-unvoiced sounds in said speech waves, and means for transmitting the pitch information, average spectral density data and voiced-unvoiced information to a speech synthesizing station for reconstructing the original speech waves therefrom.

4. A speech transmission system comprising a variable-parameter speech-analyzer, said speech-analyzer including means for deriving from an input speech wave a pair of multi-bit word streams representing respectively in digital form the in-phase and quadrature components thereof, computer means for deriving from said pair of word streams a digital presentation of the amplitude spectral density characteristics of said input speech wave; said computer means including a data storage medium for storing said word streams in frames of data, means for sequentially reading stored frames of data from said storage medium and for combining the data in each frame with preselected control data for establishing the resolution, precision, and envelope of said spectral density characteristics, and means for gating the combined data from said computer means at predetermined intervals of each frame to provide discrete samples of the amplitude spectrum of said speech wave in said digital presentation; means for averaging contiguous portions of said digital presentation derived by said computer means, means for extracting signal information representative of the pitch frequency of said input speech wave from said digital presentation, means for detecting from said digital presentation data representative of the voiced-unvoiced characteristics of said speech wave, and means for assembling the data developed by said averaging means and by said detecting means and said extracted signal information in a transmission format from which said input speech wave is to be reconstructed.

5. Vocoder apparatus for the transmission of coded information signals representative of the characteristics of a speech wave to a speech synthesizing station, said apparatus comprising means for converting said speech wave to a digital format consisting of a plurality of groups of serial pulses each group forming a data word indicative of the amplitude of the in-phase and quadrature components of a distinct portion of said speech wave, Fourier transform means for combining the data words with preselected control data to provide discrete measurements of the amplitude spectrum of said speech wave, means for averaging selected ones of the discrete measurements in groups of arbitrary number to compress the number of said measurements into a smaller quantity of spectral density data samples, means for extracting voiced-unvoiced signal information in said speech wave from said discrete measurements, means for deriving pitch signal information from a predetermined number of said discrete measurements, and means for generating said coded information signals from said spectral density data samples, said pitch signal information and said voiced-unvoiced signal information.

6. An adaptive digital channel vocoder comprising a single processing channel for analyzing the amplitude spectrum of a speech wave, said channel including means for converting said speech wave from an analog signal to a digital signal, means responsive to said digital signal for deriving therefrom samples of the amplitude spectrum of said speech wave, and means responsive to said spectrum samples for compression thereof into a smaller number of digital signals each representative of the average spectral density of preselected groups of said spectrum samples for transmission to a speech synthesizing station.

7. The combination according to claim 6 wherein said means for deriving said amplitude spectrum samples includes a digital Fourier transform unit comprising means for storing discrete, sequential portions of said digital signal, means for sequentially reading said discrete portions of said signal from said storing means in frames of data covering equal time intervals, means for combining successive equal portions of each frame of data with reference data for controlling the sampling interval of said amplitude spectrum, and gate means for passing the combined data in a digital format of said samples.

8. The combination according to claim 7 wherein is further included means responsive to each successive amplitude spectrum sample for generating respective signals representative of the absolute value thereof.

9. The combination according to claim 8 wherein is included means for generating pulses in synchronism with the generation of each of said absolute valued spectrum samples; and wherein said means for compressing includes first programmable means responsive to preselected ones of the synchronization pulses for generating first output pulses in accordance therewith, second programmable means for generating second output pulses in response to selected ones of said first output pulses, accumulator means responsive to said first output pulses for storing absolute valued spectrum samples in time synchronism therewith, means for counting the number of said second output pulses generated by said second programmable means, divider means, means for applying the contents of said accumulator means and of said counting means to said divider means for division of the former by the latter, whereby said divider means generates signals representative of the average spectral density of preselected groups of said absolute valued spectrum samples.

10. In a processing system for the transmission of information-bearing complex electrical waveforms as coded signals representative of amplitude spectral density and of fundamental frequency of periodic portions of the complex waveforms, means coupled to receive a complex waveform for conversion thereof to a pair of streams of multi-digit words representative respectively of sampled levels of the in-phase and quadrature components of said complex waveform in a digital format, means for developing from said pair of word streams a further pair of respective discrete signal sequences indicative of the amplitude spectral density of said complex waveform, means for averaging preselected groups of the amplitude spectral density signals to provide a reduced number of digitally coded signals representative of the information conveyed by said waveform, means for deriving from said spectral density signals further digitally coded signals representative of the fundamental frequency of the periodic portions of said waveform; and means for synthesizing and reconstructing said complex waveform from said transmitted coded signals.

11. A channel vocoder adapted to eliminate the requirement of multi-channel bandpass filters while retaining the contiguous narrow-band, speech wave analysis function thereof, said vocoder including means for sampling an analog signal representative of said speech wave to produce discrete samples thereof and for generating a multibit signal representative of the information conveyed by each sample, Fourier transform means responsive to each multi-bit signal for generating a digital presentation of the amplitude spectrum of said speech wave to provide said contiguous narrow-band speech wave analysis, and means for combining adjacent portions of said digital presentation to obtain mean spectral density signals for subsequent reconstruction of said speech wave.

12. In an adaptive digital vocoder system for the transmission of voiced/unvoiced data, pitch information, and samples of mean amplitude spectral density derived from a speech wave in a digital format and for reconstructing the original speech wave from the digital format, means responsive to said samples of mean spectral density for conversion thereof to measurement signals indicative of discrete amplitude spectra of said speech wave, means responsive to said voiced/unvoiced data and to said pitch information for deriving therefrom spectral signals representative of the voiced and unvoiced sounds of the speech wave, means for synthesizing the spectrum of said speech wave in the frequency domain from the voiced and unvoiced sound-representative signals and the measurement signals, means for deriving digital word streams representative of the in-phase and quadrature components of said speech wave from the synthesized spectrum, means for converting said digital word streams to analog signals, and means for combining the analog signals to reconstruct the original speech wave.

13. In a system for analyzing the spectrum of an electrical input waveform and for conveying information representative of that analysis in sequential transmission format, means responsive to said input waveform and to a preselected reference waveform for deriving therefrom a pair of analog signals representative respectively of the in-phase and quadrature components of said input waveform relative to the phase quadrature components of said reference waveform; means for sampling said pair of analog signals to provide a pair of digitally coded word sequences representative respectively of the information conveyed by said pair of analog signals; means for processing said word sequences in frames of data each containing a predetermined number of digitally coded words to generate therefrom a respective pair of streams of discrete data samples of the amplitude spectral density of said in-phase and quadrature components; means for combining said pair of streams to form a single stream of discrete data samples of the amplitude spectral density of said input waveform; and means responsive to said single stream of discrete data samples for conversion thereof to a sequential transmission format containing a smaller number of selected discrete data samples of the amplitude spectral density of said input waveform and further containing digital data indicative of the periodic and aperiodic components and fundamental frequency of the periodic components of said input waveform.

14. The combination according to claim 13 wherein the last-named means includes:

means for separating said single stream into groups of successive discrete data samples and for deriving from each group a representative sample of the information conveyed by all of the discrete data samples of the group;

means for deriving from said single stream digital samples indicative of fundamental frequency of the periodic components of said input waveform;

means for deriving from said single stream digital samples for distinguishing between periodic and aperiodic components of said input waveform; and means for interlacing said representative samples derived from each group, said frequency-indicative digital samples, and said periodic and aperiodic component-distinguishing digital samples to form said sequential transmission format.

15. The combination according to claim 13 including means for synchronizing the operation of said means for processing, said means for combining and said means for conversion in accordance with the predetermined time period occupied by each of said frames of data.

16. In a system for synthesizing an electrical input waveform in accordance with the information conveyed by the sequential transmission format provided by the system of claim 14, means responsive to said transmission format for separating said representative samples of amplitude spectral density derived from each group, said frequency-indicative digital samples, and said periodic and aperiodic component-distinguishing digital samples therefrom; means for deriving from said representative samples a substantial replica of the single stream of discrete data samples of the amplitude spectral density of said input waveform produced by said means for combining; means responsive to the derived single stream, to the frequency-indicative digital samples, and to the component-distinguishing digital samples for separating the discrete data samples in said derived single stream into respective in-phase and quadrature components thereof, and for amplitude modulating said last-named in-phase and quadrature components with the periodic and aperiodic component information conveyed by said frequency-indicative digital samples and by said component-distinguishing digital samples; means responsive to the pair of streams of modulated in-phase and quadrature components of said discrete samples of amplitude spectral density for processing thereof in frames of data each containing a predetermined number of samples to form a respective pair of digitally coded word sequences representative of the information conveyed by said last-named pair of streams; means for converting said last-named pair of digitally coded word sequences to a respective pair of analog signals; and means for combining said pair of analog signals with further signals representative of the phase quadrature components of said reference waveform to reproduce said input waveform.

17. The combination according to claim 16 wherein said means for separating and for amplitude modulating said in-phase and quadrature components includes a pair of multipliers; means for applying said derived single stream of discrete data samples of amplitude spectral density in parallel to said pair of multipliers; means for generating sequences of pseudo-random numbers; means responsive to said frequency-indicative digital samples for generating periodic sequences of numbers representative respectively of in-phase and quadrature spectral components of a periodic signal determined by said frequency-indicative digital samples; and switch means responsive to said periodic and aperiodic component-distinguishing digital samples for applying said pseudo-random sequences or said periodic signal sequences to said multipliers in accordance with whether said component-distinguishing samples are indicative of aperiodic or periodic components, respectively.

18. The combination according to claim 16 including means for synchronizing the operation of said means for deriving said substantial replica of said single stream, said means for separating and for amplitude modulating, and said means for processing said pair of streams of modulated in-phase and quadrature components in accordance with a predetermined frame rate.

19. Speech transmission apparatus comprising means responsive to an incoming speech wave and to a preselected reference wave for obtaining therefrom a signal which includes in-phase and quadrature spectral components with frequencies less than half the highest frequency contained in said wave, means for converting said signal to a sequential stream of digital data words representative of the characteristics of said speech wave, means for dividing said sequential stream of data words into frames of data each containing a predetermined number of data words and for multiplying the data words in each frame with preselected weighting signals to controllably obtain therefrom a plurality of discrete amplitude spectrum samples of said speech wave, means for combining said samples in successive groups each of predetermined number of samples to produce from each group of samples a single sample representative of the information conveyed by that group, means for deriving from said samples provided by said means for dividing and multiplying digital data signals representative of the location of voiced and unvoiced sounds and pitch characteristics of said speech wave, means for assembling the digital data signals and the group information-representative samples into a sequential signal format and for conveying said format to a synthesizing station, means at said synthesizing station for separating said digital data signals and said group information-representative samples from said format, means for recreating said groups of discrete amplitude spectrum samples from said group information-representative samples, means under the control of said digital data signals for amplitude modulating the last-named discrete amplitude spectrum samples with voiced-unvoiced weighted samples, means for multiplying the amplitude modulated samples with weighting signals constituting the inverse of said first-named weighting signals to provide a further sequential stream of digital data words approximating the first-named sequential stream, and means for converting said further sequential stream of digital data words to an analog signal to provide an artificial speech wave corresponding to said incoming speech wave.

20. A method of encoding and reconstructing a band-limited speech wave, comprising the steps of deriving from said speech wave a plurality of analog signals representative of electrical parameters of spectral components of said wave, sampling said signals to obtain time domain digital data indicative of the information conveyed by said analog signals, subjecting said digital data to a Fourier transformation to derive therefrom frequency domain spectral density information digitally representative of the spectrum of said speech wave, and compressing the digital spectral density information to form mean spectral density samples of the speech wave from which to subsequently reconstruct the original speech wave.

21. A method of encoding speech in digital format for transmission to a remote point, comprising the steps of converting the speech wave to groups of pulses constituting digital words indicative of amplitude and phasing of components of said speech wave, obtaining from said digital words discrete measurements of the amplitude spectrum of said speech wave by a digital Fourier transformation, and averaging said discrete measurements in predetermined groups to produce compressed data representing spectral density samples of the speech wave.

22. A method for processing speech waves to obtain digital data from which each speech wave may be reconstructed, comprising deriving from a speech wave digitized samples of the amplitude spectrum of the wave, averaging the amplitude spectrum samples in groups of predetermined number to obtain compressed representations of spectral density of the wave, detecting pitch and voice-unvoice information of said wave from said amplitude spectrum samples, and generating a digital format of said compressed representations of spectral density and said pitch and voice-unvoice information from which to synthesize the original speech wave.

23. A method of encoding information for synthesizing a speech wave, comprising combining the speech wave with sinusoidal phase quadrature components of a reference wave to derive therefrom signals having frequencies proportional to the sum and difference of the frequencies of said speech wave and said reference wave, sampling the signals proportional to one of said sum and difference of frequencies at intervals of time inversely proportional to the frequency of said reference wave and subjecting the signal samples to a digital Fourier transformation to obtain a digital representation of the amplitude spectrum of said speech wave.

24. The method according to claim 23 wherein said Fourier transformation is followed by averaging the transformed samples in groups of predetermined number to provide compressed spectral density data for said speech wave in digital format.

25. The method according to claim 24 further including the step of detecting the pitch and voicing of said speech wave from the transformed samples in accordance with increase-decrease transitions of successive ones thereof and with periodicity and aperiodicity of successive ones thereof, respectively, and generating digital representations of said pitch and voicing.

26. The method according to claim 24 further including synthesizing said speech wave by expanding said compressed data and performing an inverse Fourier transformation on the expanded data.

27. A method for analyzing the spectrum of a complex electrical waveform comprising combining said waveform with a reference waveform having preselected phase quadrature related frequency components to obtain a pair of further waveforms containing sum and difference frequency components of said complex waveform and said reference waveform, sampling said further waveforms to derive therefrom a pair of digitally coded word sequences indicative of the information conveyed by said complex waveform, and performing a digital Fourier transformation of the word sequences to derive therefrom discrete samples of the amplitude spectral density of said complex waveform.

28. The method of claim 27 further including the step of averaging groups of said spectral density samples of preselected number to compress the spectral density data into a compact format.

29. The method of claim 28 further including extracting from the spectral density samples digital information relating to fundamental frequency and periodicity of said complex waveform.

30. The method of claim 27 including reconstitution of the original complex waveform by inverse Fourier transformation of the amplitude spectral density samples, and conversion of the resulting digital word sequences to analog form.

31. A method for analyzing and synthesizing waveforms, comprising sampling the waveform under consideration at a predetermined frame rate to provide time sequential digital samples of amplitude thereof conforming to a Fourier series representation, processing said samples to derive therefrom sine and cosine coefficients of the amplitude spectrum of said waveform, and recovering the original waveform by successively processing the spectral sine and cosine coefficients on a cycle corresponding to the frequency separation between amplitude lines of the spectrum, with sine and cosine functions of the sampling time.

32. A method for analyzing and synthesizing waveforms, comprising sampling the waveform under consideration at a predetermined frame rate to provide time sequential digital samples of amplitude thereof conforming to a Fourier series representation, processing said samples to derive therefrom sine and cosine coefficients of the amplitude spectrum of said waveform, and synthesizing the original waveform from the sine and cosine coefficients of the amplitude spectrum by inverse Fourier transformation with sine and cosine functions of the sampling time.

33. Apparatus for synthesizing band-limited signals from digital sequences of amplitude values of sine and cosine components of said signals, comprising means responsive to said digital sequences for transformation thereof to data streams constituting amplitude samples of the in-phase and quadrature components of said signals, said means including means for combining each member of the first-named sequences with further signals representing respective functions of time including position of each sample and number of samples required to synthesize said band-limited signals.

34. In a method for analyzing the spectrum of a complex band-limited waveform by processing digital time sequential samples of said waveform, the step of deriving from said samples by finite Fourier analysis the amplitude coefficients of spectral lines of said waveform with predetermined frequency separation between said lines, said analysis including successively translating the frequency of each sample to a new frequency, such that successively processed samples are ultimately spaced by a frequency corresponding to said predetermined frequency separation, wherein said digital time sequential samples are orthogonal pairs of samples obtained respectively from said waveform and from a 90-degree phase-shifted replica of said waveform, and wherein said amplitude coefficients are combined with spectral cosine and sine components representative of the amplitude spectrum of said waveform and said phase-shifted replica thereof, and further including the step of combining said components and amplitude coefficients with respective orthogonal components and amplitude coefficients, to derive therefrom the power spectrum of said waveform.

References Cited

UNITED STATES PATENTS

| | | | |
|---|---|---|---|
| 3,109,070 | 10/1963 | David et al. | 179—15.55 |
| 3,257,511 | 6/1966 | Adler et al. | 179—15 |
| 3,349,183 | 10/1967 | Campanella | 179—15.55 |

ROBERT L. GRIFFIN, *Primary Examiner.*

J. T. STRATMAN, *Assistant Examiner.*

UNITED STATES PATENT OFFICE

CERTIFICATE OF CORRECTION

Patent No. 3,403,227 September 24, 1968

Robert E. Malm

It is certified that error appears in the above identified patent and that said Letters Patent are hereby corrected as shown below:

Column 35, line 28, beginning with "33. Apparatus" cancel all to and including "signals." in line 3, column 36. Column 36, line 4, "34." should read -- 33. --; same column 36, after line 25, insert the following claims:

34. In a method for transforming time sequential digital samples of orthogonal versions of a band-limited time-varying signal to a digital representation of the amplitude spectrum of said signal, wherein the spectral lines are separated by or approximately by the frequency to which said signal is band-limited, during a preselected time frame, processing said samples as follows:

combining the samples derived from each of said orthogonal versions of said signal with predeveloped signals representing cosine and sine functions of the position of the sample in the time sequence and the number of samples in the time frame, to produce the product of each sample with the respective predeveloped signal, additively combining each said product with the product of the orthogonal sample and its respective predeveloped signal, summing the additive combinations for each pair of products so derived with the next sample and orthogonal sample in the sequence, respectively, and repeating said processing for each succeeding sample and respective orthogonal sample to successively translate the frequency of each sample to a predetermined higher or lower frequency, depending on the properties of each said predeveloped signal, until a desired set of frequency translated samples is derived from said summing step, each processed sample corresponding to a component of the line spectrum of said signal, each spectral line separated from the preceding spectral line by a frequency corresponding to the frequency translation of successively processed samples.

35. The method of claim 34 further including reversing the order of the samples prior to said processing.

36. In a method for analyzing the spectrum of a complex band-limited waveform by processing digital sequences representative of samples of said waveform, the step of deriving from said samples by finite Fourier analysis the amplitude coefficients of spectral lines of said waveform with predetermined frequency separation between said lines, said analysis including translating the frequency of each sample to a new frequency, such that successively processed samples are ultimately spaced by a frequency corresponding to said predetermined frequency separation, wherein said digital sequences are representative of orthogonal pairs of samples of said waveform and of a 90-degree phase-shifted replica of said waveform, and wherein said amplitude coefficients are combined with spectral cosine and sine components representative of the amplitude spectrum of said waveform and said phase-shifted replica thereof.

37. The method of claim 36 wherein the frequency translation is accomplished by modulating each sample with a frequency function selected to produce the desired frequency separation between samples.

38. A method for analyzing waveforms, comprising generating digital data representative of samples of the waveform under consideration occurring at a predetermined frame rate to provide time sequential digital amplitude-representative samples of said waveform conforming to a Fourier series representation, and processing said amplitude-representative samples to derive therefrom sine and cosine coefficients of the amplitude spectrum of said waveform.

39. The method of claim 38 wherein said samples of which said generated digital data is representative correspond to amplitude samples of phase quadrature related versions of said waveform.

40. The method of claim 39 wherein said processing includes successively combining said amplitude-representative samples with sine and cosine functions of frequency selected in accordance with the spectral line index for the number of amplitude-representative samples derived during a particular frame, and summing each combination with the next successive amplitude-representative sample to provide the desired spectral sine and cosine components.

In the heading to the printed specification, line 7, "34 Claims." should read -- 40 Claims. --.

Signed and sealed this 3rd day of March 1970.

(SEAL)
Attest:

EDWARD M. FLETCHER, JR.
Attesting Officer

WILLIAM E. SCHUYLER, JR.
Commissioner of Patents